US012615129B2

(12) United States Patent (10) Patent No.: US 12,615,129 B2
Lyu et al. (45) Date of Patent: *Apr. 28, 2026

(54) FRAME STRUCTURES FOR WIRELESS COMMUNICATION

(71) Applicant: Huawei Technologies Co., Ltd., Shenzhen (CN)

(72) Inventors: Yongxia Lyu, Shenzhen (CN); Jianglei Ma, Ottawa (CA); Peiying Zhu, Ottawa (CA); Liqing Zhang, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/516,085

(22) Filed: Nov. 21, 2023

(65) Prior Publication Data

US 2024/0089073 A1 Mar. 14, 2024

Related U.S. Application Data

(63) Continuation of application No. 17/087,818, filed on Nov. 3, 2020, now Pat. No. 11,888,787.

(Continued)

(51) Int. Cl.
*H04L 5/14* (2006.01)
*H04L 5/00* (2006.01)
*H04W 72/0446* (2023.01)

(52) U.S. Cl.
CPC .............. *H04L 5/14* (2013.01); *H04L 5/0007* (2013.01); *H04L 5/0053* (2013.01); *H04W 72/0446* (2013.01)

(58) Field of Classification Search
CPC ... H04L 5/14; H04L 27/26025; H04L 5/0007; H04L 5/001; H04L 5/003; H04L 5/0053;
(Continued)

(56) References Cited

U.S. PATENT DOCUMENTS 9,258,163 B2 * 2/2016 Yang ................... H04L 27/2602
10,091,714 B2 * 10/2018 Barriac .............. H04W 74/006
(Continued)

FOREIGN PATENT DOCUMENTS

CN 105553605 A 5/2016
CN 106937388 A 7/2017
(Continued)

OTHER PUBLICATIONS

3rd Generation Partnership Project; Technical Specification Group Radio Access Network; NR; Physical layer procedures for control (Release 15), Technical specification, 3GPP TS 38.213 V15 6.0, Jun. 2019. 107 pages.

(Continued)

*Primary Examiner* — Bailor C Hsu
(74) *Attorney, Agent, or Firm* — Slater Matsil, LLP

(57) ABSTRACT

Current frame structures in Long-Term Evolution (LTE) and New Radio (NR) are not designed to accommodate full duplex (FD) communication. Embodiments are disclosed in which frame structures are provided that support FD communication and frequency division duplex (FDD) communication and time division duplex (TDD) communication. In some embodiments, there is defined two separate and independent frame structures: a frame structure for reception (e.g. a downlink frame structure) and a frame structure for transmission (e.g. an uplink frame structure).

18 Claims, 19 Drawing Sheets

Related U.S. Application Data

(60) Provisional application No. 63/006,819, filed on Apr. 8, 2020, provisional application No. 62/939,207, filed on Nov. 22, 2019.

(58) Field of Classification Search
CPC ............ H04L 5/0094; H04W 72/0446; H04W 72/0453
See application file for complete search history.

(56) References Cited

U.S. PATENT DOCUMENTS

| | | | |
|---|---|---|---|
| 10,306,660 B2 * | 5/2019 | Gupta ................... | H04W 72/51 |
| 10,405,306 B2 | 9/2019 | Chen et al. | |
| 10,433,346 B1 * | 10/2019 | Kencharla ......... | H04W 72/0453 |
| 11,483,803 B2 * | 10/2022 | Xue ...................... | H04W 28/26 |
| 2013/0223294 A1 | 8/2013 | Karjalainen et al. | |
| 2014/0341051 A1 * | 11/2014 | Gaal ................... | H04B 7/2656 |
| | | | 370/252 |
| 2015/0016309 A1 | 1/2015 | Fang et al. | |
| 2015/0085718 A1 * | 3/2015 | Chen ........................ | H04L 5/14 |
| | | | 370/280 |
| 2015/0092703 A1 | 4/2015 | Xu et al. | |
| 2015/0334702 A1 | 11/2015 | Ji et al. | |
| 2016/0088500 A1 * | 3/2016 | Chen ................... | H04L 5/0092 |
| | | | 370/280 |
| 2016/0119921 A1 | 4/2016 | Ma | |
| 2016/0233904 A1 | 8/2016 | Wu et al. | |
| 2016/0353436 A1 | 12/2016 | Au et al. | |
| 2016/0353453 A1 | 12/2016 | Au et al. | |
| 2017/0019218 A1 | 1/2017 | Sadeghi et al. | |
| 2017/0272221 A1 | 9/2017 | Yi et al. | |
| 2017/0280472 A1 * | 9/2017 | Gupta ................... | H04W 72/51 |
| 2017/0338920 A1 | 11/2017 | Kim et al. | |
| 2018/0124718 A1 | 5/2018 | Ng et al. | |
| 2018/0213531 A1 | 7/2018 | Kim et al. | |
| 2018/0309513 A1 | 10/2018 | Kim et al. | |
| 2018/0367289 A1 | 12/2018 | Kim et al. | |
| 2019/0082448 A1 | 3/2019 | Nogami et al. | |
| 2019/0123872 A1 | 4/2019 | Au et al. | |
| 2019/0223084 A1 * | 7/2019 | John Wilson ......... | H04W 48/10 |
| 2019/0268903 A1 | 8/2019 | Lee et al. | |
| 2020/0228196 A1 | 7/2020 | Wilson et al. | |
| 2020/0351897 A1 * | 11/2020 | Fakoorian ............. | H04W 72/23 |
| 2021/0007122 A1 * | 1/2021 | Takeda ................... | H04L 5/0035 |
| 2021/0160111 A1 * | 5/2021 | Ma .......................... | H04L 5/0044 |
| 2021/0160918 A1 | 5/2021 | Yerramalli et al. | |
| 2021/0258133 A1 * | 8/2021 | Raghavan ............. | H04B 1/525 |
| 2022/0167392 A1 * | 5/2022 | Tian ...................... | H04L 1/1854 |
| 2024/0137195 A1 * | 4/2024 | Abotabl ................ | H04L 5/1469 |

FOREIGN PATENT DOCUMENTS

| | | |
|---|---|---|
| CN | 107371265 A | 11/2017 |
| JP | 2019534607 A | 11/2019 |
| WO | 2013173558 A2 | 11/2013 |
| WO | 2017179921 A1 | 10/2017 |

OTHER PUBLICATIONS

3rd Generation Partnership Project; Technical Specification Group Radio Access Network; Evolved Universal Terrestrial Radio Access (E-UTRA); Physical channels and modulation (Release 15). Technical specification 3GPP 36-211 V15.5.0. Mar. 2019. 238 pages.

3rd Generation Partnership Project; Technical Specification Group Radio Access Network; NR; Radio Resource Control (RRC) protocol specification (Release 15). Technical specification. 3GPP TS 38.331 V15.6.0. Jun. 2019 519 Pages.

3rd Generation Partnership Project; Technical Specification Group Radio Access Network; NR; Physical channels and modulation (Release 15), Technical specification. 3GPP TS 38 211. Jun. 2019, 97 pages.

Ericsson, "Frame structure for NR", TSG-RAN WG1 #84bis, Busan, South Korea, Apr. 11-15, 2016, R1-163226, 2 pages.

* cited by examiner 110,170

| Transmitting Module |
| :---: |
| Receiving Module |
| Processing Module |

Numerology 1: 15kHz subcarrier spacing (1 slot = 1 subframe = 1ms)

14 OFDM symbols (normal CP)

= cyclic prefix (CP)

1 frame (10ms)

1 subframe (1ms)

Numerology 2: 30kHz subcarrier spacing (1 slot = 1/2 subframe = 0.5ms)

14 OFDM symbols (normal CP)

= cyclic prefix (CP)

1 frame (10ms)

1 subframe (1ms)

1 slot (14 OFDM symbols for normal CP)

= cyclic prefix (CP)

D = downlink

F = flexible

U = uplink

FIG. 10

Table 1: Reception Frame Communication Direction Pattern

| Index | 1 | 2 | 3 | 4 | 5 | 6 | 7 | 8 | 9 | 10 |
|-------|---|---|---|---|---|---|---|---|---|----|
| 1 | R | F | F | F | F | R | F | F | F | F |
| 2 | R | R | F | F | F | R | R | F | F | F |
| 3 | R | R | R | F | F | R | R | R | F | F |
| 4 | R | R | R | R | F | R | R | R | R | F |
| 5 | R | R | R | R | R | R | R | R | R | R |
| 6 | F | F | F | F | F | F | F | F | F | F |

Reception Frame

| ? | ? | ? | ? | ? | ? | ? | ? | ? | ? |
|---|---|---|---|---|---|---|---|---|---|

Transmission Frame

| ? | ? | ? | ? | ? | ? | ? | ? | ? | ? |
|---|---|---|---|---|---|---|---|---|---|

Table 2: Transmission Frame Communication Direction Pattern

| Index | 1 | 2 | 3 | 4 | 5 | 6 | 7 | 8 | 9 | 10 |
|-------|---|---|---|---|---|---|---|---|---|----|
| 1 | X | X | X | X | X | X | X | X | X | X |
| 2 | F | F | F | F | F | F | F | F | F | F |
| 3 | T | T | T | T | T | T | T | T | T | T |

FIG. 11

FRAME STRUCTURES FOR WIRELESS COMMUNICATION

CROSS-REFERENCE TO RELATED APPLICATIONS

The present application is a continuation of U.S. patent application Ser. No. 17/087,818, now U.S. Pat. No. 11,888, 787 issued on Jan. 30, 2024, entitled "Frame Structures for Wireless Communication," filed on Nov. 3, 2020, which claims the benefit of U.S. Provisional Patent Application Ser. No. 62/939,207, entitled "Flexible Frame Structure for Wireless Communication," filed on Nov. 22, 2019, and U.S. Provisional Patent Application Ser. No. 63/006,819, entitled "Frame Structures for Wireless Communication," filed on Apr. 8, 2020, applications of which are incorporated herein by reference in their entireties.

TECHNICAL FIELD

The present application relates to wireless communication, and more specifically to frame structures for wireless communication.

BACKGROUND

In some wireless communication systems, user equipments (UEs) wirelessly communicate with one or more base stations. A wireless communication from a UE to a base station is referred to as an uplink communication. A wireless communication from a base station to a UE is referred to as a downlink communication. Resources are required to perform uplink and downlink communications. For example, a base station may wirelessly transmit data to a UE in a downlink communication at a particular frequency for a particular duration of time. The frequency and time duration are examples of resources.

Time-frequency resources are allocated for communications between UEs and a base station. Multiple access occurs when more than one UE is scheduled on a set of time-frequency resources. Each UE uses a portion of the time-frequency resources to receive data from the base station in the case of a downlink communication, or to transmit data to the base station in the case of an uplink communication.

A frame structure is a feature of the wireless communication physical layer that defines a time domain signal transmission structure, e.g. to allow for timing reference and timing alignment of basic time domain transmission units. Wireless communication between UEs and one or more base stations occur on time-frequency resources governed by a frame structure. The frame structure may sometimes instead be called a radio frame structure.

Current frame structures in Long-Term Evolution (LTE) and New Radio (NR) place some restrictions on the frame structure, e.g. a particular frame structure may only be used for frequency division duplex (FDD) or time-division duplex (TDD) communication. FDD communication is when the downlink and uplink transmissions occur in different frequency bands. TDD communication is when the downlink and uplink transmissions occur over different time durations.

SUMMARY

Some wireless communication devices may have the capability to perform full duplex (FD) communication. FD communication is communication in which the transmission and reception occurs on the same time-frequency resource, i.e. the communication device can both transmit and receive on the same frequency resource concurrently in time. For example, a UE performing FD communication may both transmit information to a base station and receive information from that base station at the same time on the same frequency. FD communication capability may be incorporated into the future generation of some wireless communication systems. However, the existing LTE and NR frame structures are not designed to accommodate FD communication. Rather, the existing LTE and NR frame structures are designed to accommodate FDD and TDD communication.

It is desired to define one or more new frame structures that can support FD communication, but that can also still support TDD and FDD communication, e.g. so that UEs communicating using FD can be accommodated, and so that other UEs communicating using FDD and/or TDD can also still be accommodated.

Embodiments are disclosed in which frame structures are provided that support FD, FDD, and TDD communications. A non-exhaustive list of application scenarios in which the frame structures may be used include: uplink/downlink communications between base stations and UEs; device-to-device (D2D) communications, e.g. over a sidelink; integrated access backhaul (JAB) communications; downlink (DL)-uplink (UL) decoupling communication system.

A frame structure that supports FD, FDD, and TDD communication provides the following technical benefit: new communication devices can be accommodated that communicate using FD communication, but the frame structure is still backwards compatible with legacy communication devices that only communicate using TDD and/or FDD communication.

In some embodiments, there is defined two separate and independent frame structures: a frame structure for reception and a frame structure for transmission. "Reception" and "Transmission", as used herein, is from the perspective of the UE. For example, in a UE/base station communication, reception is downlink and transmission is uplink. By defining separate frame structures for transmission and reception, the following technical benefit may be achieved: the frame structure for reception (e.g. downlink) may be configured independently from the frame structure for transmission (e.g. uplink), which can allow for increased flexibility to accommodate different application scenarios. For example, the subcarrier spacing and/or frame duration and/or number of symbols, slots, and/or subframes in a frame may be set differently for uplink and downlink communications. This flexibility may be used to accommodate different application scenarios, some of which may involve communication that is asymmetric in the downlink and uplink (e.g. much more downlink communication than uplink communication). In some scenarios, this flexibility may be used to accommodate a DL-UL decoupling system, e.g. one DL frequency band/carrier may be associated with two UL frequency bands/carriers.

Although the embodiments below will primarily be discussed in the context of downlink and uplink communications between UEs and a base station, the embodiments also apply to sidelink communications (i.e. D2D communications) between two UEs, as well as IAB communications. The embodiments are also applicable to various different applications, such as satellite communication and/or Internet of Vehicle (IoV).

In one embodiment, there is provided a method performed by an apparatus. The method may include receiving a first indication that configures a first frame structure. A first frame in the first frame structure may include a time duration that is configured for receiving a first wireless transmission from a device. The method may further include receiving a second indication that configures a second frame structure. A second frame in the second frame structure may include a time duration that is configured for transmitting a second wireless transmission to the device. The method may further include wirelessly communicating with the device according to the first frame structure and the second frame structure. In some embodiments, the first indication and the second indication are both received in same control signaling. For example, the first indication and the second indication may be in different information elements in the same control signaling. In some embodiments, the first indication indicates at least one of the following parameters of the first frame structure: frame length of the first fame; subcarrier spacing of symbols communicated in the first frame; number of time durations within the first frame for which a respective communication direction is configured; length of one or more of the time durations within the first frame for which the respective communication direction is configured; the respective communication direction configured for each of the one or more time durations. An apparatus is also disclosed to perform the methods, e.g. the apparatus may include a memory to store processor-executable instructions, and a processor to execute the processor-executable instructions to cause the apparatus to perform the method steps.

Note that "length" and "duration" (or "time duration") will be used interchangeably herein. The word "length" refers to length in the time domain, i.e. length in time. Also, "control signaling" and "signaling" will be used interchangeably herein.

BRIEF DESCRIPTION OF THE DRAWINGS

Embodiments will be described, by way of example only, with reference to the accompanying figures wherein:

FIG. 4 is a block diagram of example component modules;

FIGS. 9 to 17 illustrate example frame structures, according to various embodiments.

DETAILED DESCRIPTION OF ILLUSTRATIVE EMBODIMENTS

For illustrative purposes, specific example embodiments will now be explained in greater detail below in conjunction with the figures.

Example Communication Systems and Devices

Figure 1:
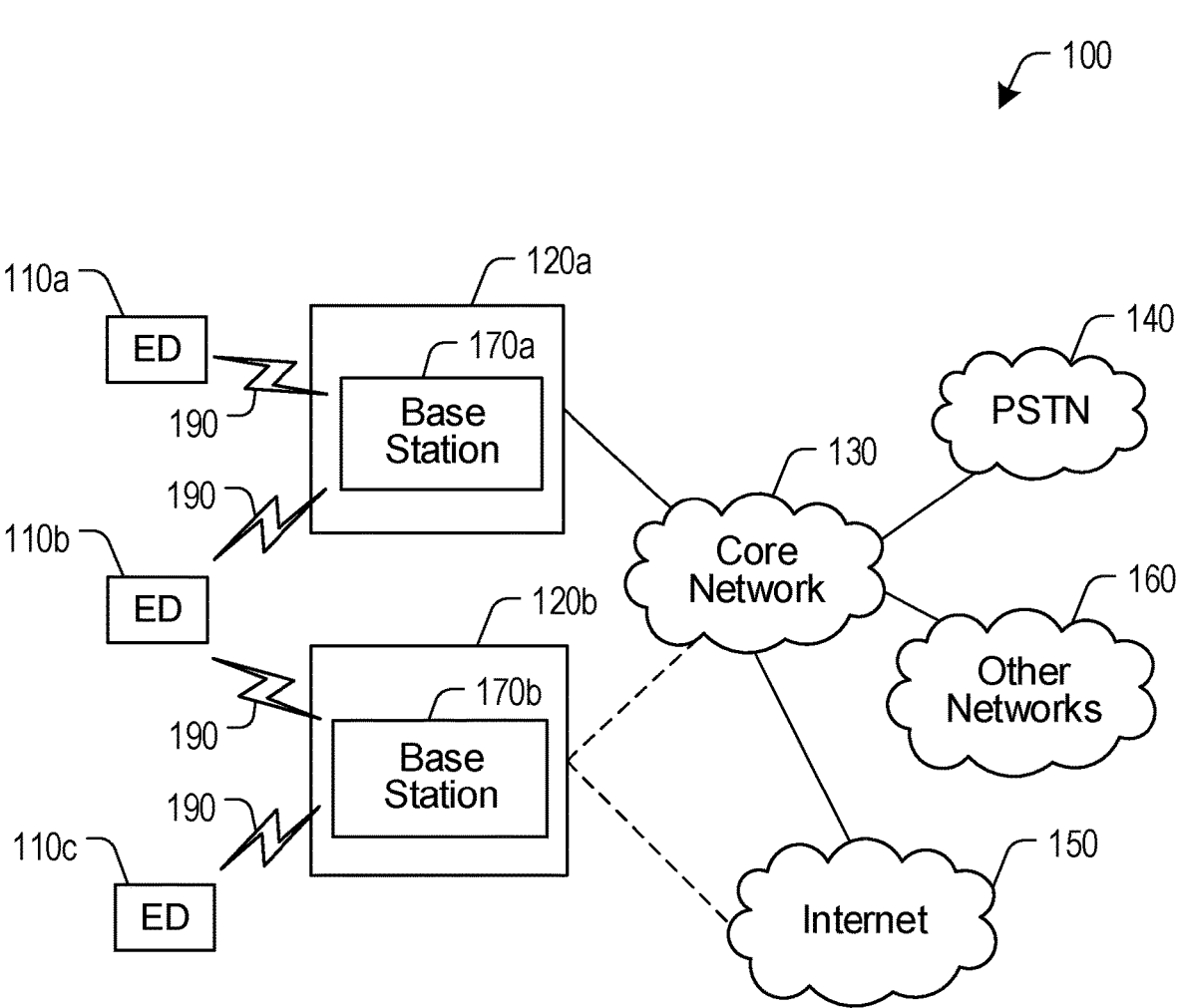
FIG. 1 is a network diagram of an example communication system.

FIG. 1 illustrates an example communication system 100. In general, the communication system 100 enables multiple wireless or wired elements to communicate data and other content. The purpose of the communication system 100 may be to provide content, such as voice, data, video, and/or text, via broadcast, narrowcast, user device to user device, etc. The communication system 100 may operate by sharing resources, such as bandwidth.

In this example, the communication system 100 includes electronic devices (ED) 110a-110c, radio access networks (RANs) 120a-120b, a core network 130, a public switched telephone network (PSTN) 140, the internet 150, and other networks 160. Although certain numbers of these components or elements are shown in FIG. 1, any reasonable number of these components or elements may be included in the communication system 100.

The EDs 110a-110c are configured to operate, communicate, or both, in the communication system 100. For example, the EDs 110a-110c are configured to transmit, receive, or both via wireless or wired communication channels. Each ED 110a-110c represents any suitable end user device for wireless operation and may include such devices (or may be referred to) as a user equipment/device (UE), wireless transmit/receive unit (WTRU), mobile station, fixed or mobile subscriber unit, cellular telephone, station (STA), machine type communication (MTC) device, personal digital assistant (PDA), smartphone, laptop, computer, tablet, wireless sensor, or consumer electronics device.

In FIG. 1, the RANs 120a-120b include base stations 170a-170b, respectively. Each base station 170a-170b is configured to wirelessly interface with one or more of the EDs 110a-110c to enable access to any other base station 170a-170b, the core network 130, the PSTN 140, the internet 150, and/or the other networks 160. For example, the base stations 170a-170b may include (or be) one or more of several well-known devices, such as a base transceiver station (BTS), a Node-B (NodeB), an evolved NodeB (eNodeB or eNB), a Home eNodeB, a gNodeB, a transmission point (TP), a site controller, an access point (AP), or a wireless router. Any ED 110a-110c may be alternatively or additionally configured to interface, access, or communicate with any other base station 170a-170b, the internet 150, the core network 130, the PSTN 140, the other networks 160, or any combination of the preceding. The communication system 100 may include RANs, such as RAN 120b, wherein the corresponding base station 170b accesses the core network 130 via the internet 150.

The EDs 110a-110c and base stations 170a-170b are examples of communication equipment that can be configured to implement some or all of the functionality and/or embodiments described herein. In the embodiment shown in FIG. 1, the base station 170a forms part of the RAN 120a, which may include other base stations, base station controller(s) (BSC), radio network controller(s) (RNC), relay nodes, elements, and/or devices. Any base station 170a, 170b may be a single element, as shown, or multiple elements, distributed in the corresponding RAN, or otherwise. Also, the base station 170b forms part of the RAN 120b, which may include other base stations, elements, and/or devices. Each base station 170a-170b transmits and/or receives wireless signals within a particular geographic region or area, sometimes referred to as a "cell" or "coverage area". A cell may be further divided into cell sectors, and a base station 170a-170b may, for example, employ multiple transceivers to provide service to multiple sectors. In some embodiments there may be established pico or femto cells where the radio access technology supports such. In some embodiments, multiple transceivers could be used for each cell, for example using multiple-input multiple-output (MIMO) technology. The number of RAN 120a-120b shown is exemplary only. Any number of RAN may be contemplated when devising the communication system 100.

The base stations 170a-170b communicate with one or more of the EDs 110a-110c over one or more air interfaces 190 using wireless communication links e.g. radio frequency (RF), microwave, infrared (IR), etc. The air interfaces 190 may utilize any suitable radio access technology. For example, the communication system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190.

A base station 170a-170b may implement Universal Mobile Telecommunication System (UMTS) Terrestrial Radio Access (UTRA) to establish an air interface 190 using wideband CDMA (WCDMA). In doing so, the base station 170a-170b may implement protocols such as HSPA, HSPA+ optionally including HSDPA, HSUPA or both. Alternatively, a base station 170a-170b may establish an air interface 190 with Evolved UTMS Terrestrial Radio Access (E-UTRA) using LTE, LTE-A, and/or LTE-B. It is contemplated that the communication system 100 may use multiple channel access functionality, including such schemes as described above. Other radio technologies for implementing air interfaces include IEEE 802.11, 802.15, 802.16, CDMA2000, CDMA2000 1x, CDMA2000 EV-DO, IS-2000, IS-95, IS-856, GSM, EDGE, and GERAN. Other multiple access schemes and wireless protocols may be utilized.

The RANs 120a-120b are in communication with the core network 130 to provide the EDs 110a-110c with various services such as voice, data, and other services. The RANs 120a-120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a-120b or EDs 110a-110c or both, and (ii) other networks (such as the PSTN 140, the internet 150, and the other networks 160). In addition, some or all of the EDs 110a-110c may include functionality for communicating with different wireless networks over different wireless links using different wireless technologies and/or protocols. Instead of wireless communication (or in addition thereto), the EDs may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as IP, TCP, UDP. EDs 110a-110c may be multimode devices capable of operation according to multiple radio access technologies, and incorporate multiple transceivers necessary to support such.

Figure 2:
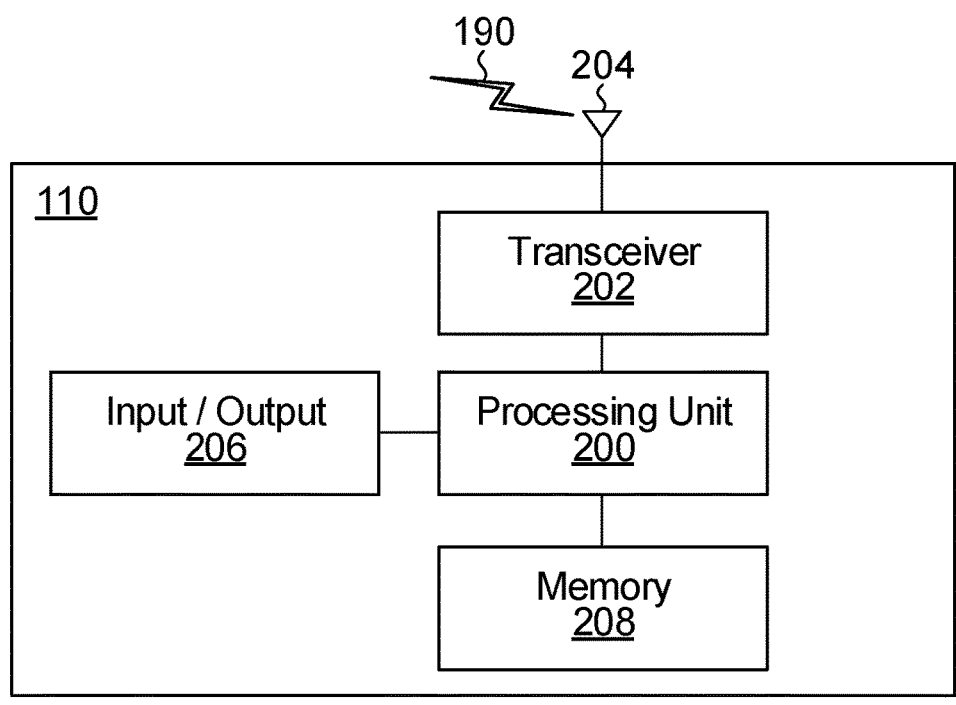
FIG. 2 is a block diagram of an example electronic device.
Figure 3:
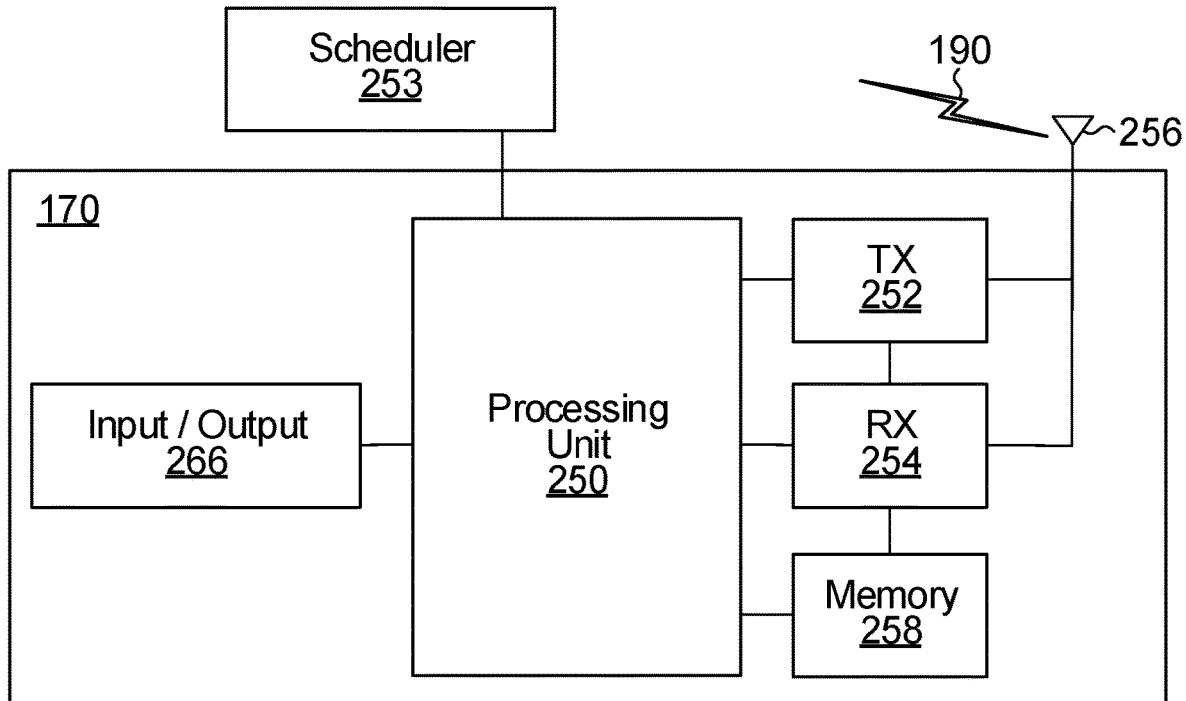
FIG. 3 is a block diagram of another example electronic device.

FIGS. 2 and 3 illustrate example devices that may implement the methods and teachings according to this disclosure. In particular, FIG. 2 illustrates an example ED 110, and FIG. 3 illustrates an example base station 170. These components could be used in the communication system 100 or in any other suitable system.

As shown in FIG. 2, the ED 110 includes at least one processing unit 200. The processing unit 200 implements various processing operations of the ED 110. For example, the processing unit 200 could perform signal coding, data processing, power control, input/output processing, or any other functionality enabling the ED 110 to operate in the communication system 100. The processing unit 200 may also be configured to implement some or all of the functionality and/or embodiments described in more detail herein. Each processing unit 200 includes any suitable processing or computing device configured to perform one or more operations. Each processing unit 200 could, for example, include a microprocessor, microcontroller, digital signal processor, field programmable gate array, or application specific integrated circuit.

The ED 110 also includes at least one transceiver 202. The transceiver 202 is configured to modulate data or other content for transmission by at least one antenna 204 or Network Interface Controller (NIC). The transceiver 202 is also configured to demodulate data or other content received by the at least one antenna 204. Each transceiver 202 includes any suitable structure for generating signals for wireless or wired transmission and/or processing signals received wirelessly or by wire. Each antenna 204 includes any suitable structure for transmitting and/or receiving wireless or wired signals. One or multiple transceivers 202 could be used in the ED 110. One or multiple antennas 204 could be used in the ED 110. Although shown as a single functional unit, a transceiver 202 could also be implemented using at least one transmitter and at least one separate receiver.

The ED 110 further includes one or more input/output devices 206 or interfaces (such as a wired interface to the internet 150). The input/output devices 206 permit interaction with a user or other devices in the network. Each input/output device 206 includes any suitable structure for providing information to or receiving information from a user, such as a speaker, microphone, keypad, keyboard, display, or touch screen, including network interface communications.

In addition, the ED 110 includes at least one memory 208. The memory 208 stores instructions and data used, generated, or collected by the ED 110. For example, the memory 208 could store software instructions or modules configured to implement some or all of the functionality and/or embodiments described herein and that are executed by the processing unit(s) 200. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 3, the base station 170 includes at least one processing unit 250, at least one transmitter 252, at least one receiver 254, one or more antennas 256, at least one memory 258, and one or more input/output devices or interfaces 266. A transceiver, not shown, may be used instead of the transmitter 252 and receiver 254. A scheduler 253 may be coupled to the processing unit 250. The scheduler 253 may be included within or operated separately from the base station 170. The processing unit 250 implements various processing operations of the base station 170, such as signal coding, data processing, power control, input/output processing, or any other functionality. The processing unit 250 can also be configured to implement some or all of the functionality and/or embodiments described in more detail herein. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission to one or more EDs or other devices. Each receiver 254 includes any suitable structure for processing signals received wirelessly or by wire from one or more EDs or other devices. Although shown as separate components, at least one transmitter 252 and at least one receiver 254 could be combined into a transceiver. Each antenna 256 includes any suitable structure for transmitting and/or receiving wireless or wired signals. Although a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s) such as those described above in connection to the ED 110. The memory 258 stores instructions and data used, generated, or collected by the base station 170. For example, the memory 258 could store software instructions or modules configured to implement some or all of the functionality and/or embodiments described above and that are executed by the processing unit(s) 250.

Each input/output device 266 permits interaction with a user or other devices in the network. Each input/output device 266 includes any suitable structure for providing information to or receiving/providing information from a user, including network interface communications.

Figure 4:
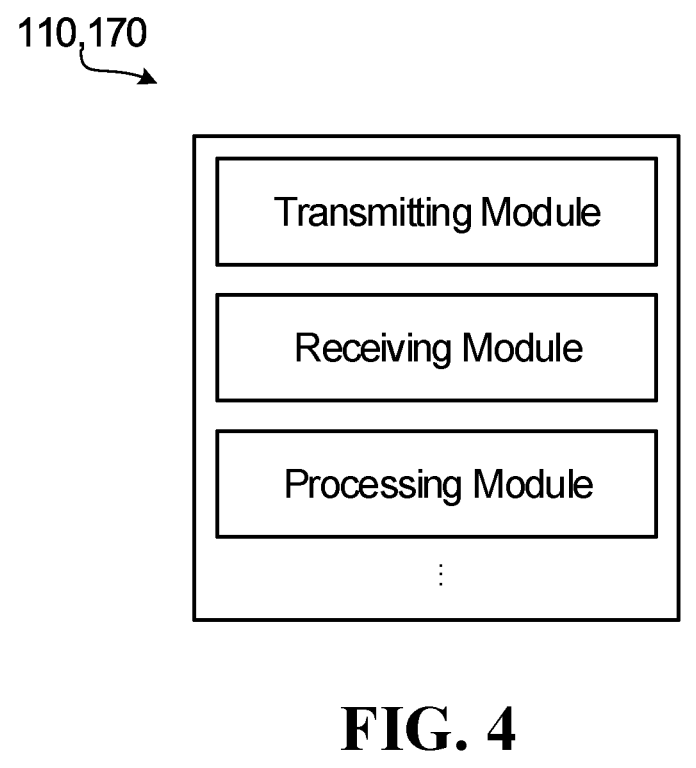

One or more steps of the embodiment methods provided herein may be performed by corresponding units or modules, according to FIG. 4. FIG. 4 illustrates units or modules in a device, such as in ED 110 or base station 170. For example, a signal may be transmitted by a transmitting unit or a transmitting module. A signal may be received by a receiving unit or a receiving module. A signal may be processed by a processing unit or a processing module. The processing module may encompass the units/modules described later, in particular the processor 210 or processor 260. Other units/modules may be included in FIG. 4, but are not shown. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Additional details regarding the EDs 110 and the base stations 170 are known to those of skill in the art. As such, these details are omitted here for clarity.

Figure 5:
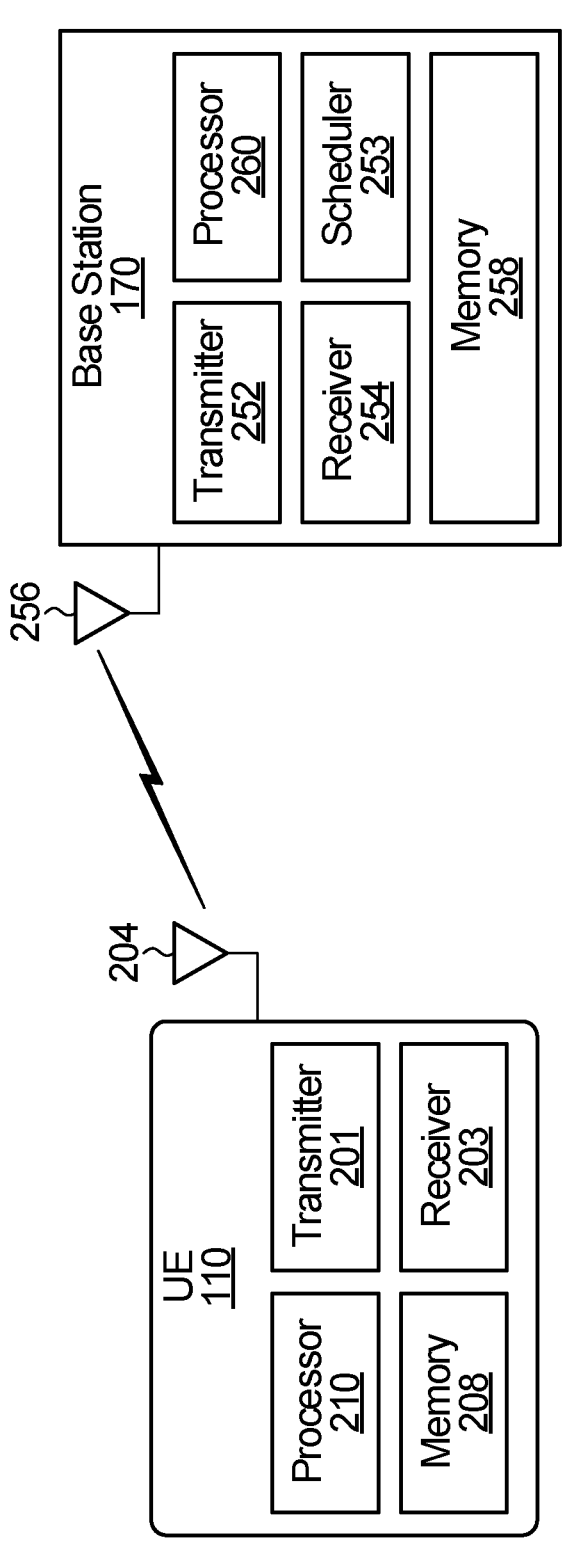
FIG. 5 is a block diagram of an example user equipment and base station.

FIG. 5 illustrates another example of an ED 110 and a base station 170. The ED 110 will hereafter be referred to as a user equipment (UE) 110 or apparatus 110.

The base station 170 may be called other names in some implementations, such as a transmit and receive point (TRP), a base transceiver station, a radio base station, a network node, a network device, a transmit/receive node, a Node B, an evolved NodeB (eNodeB or eNB), a gNB, a relay station, or a remote radio head. In some embodiments, the parts of the base station 170 may be distributed. For example, some of the modules of the base station 170 may be located remote from the equipment housing the antennas of the base station 170, and may be coupled to the equipment housing the antennas over a communication link (not shown). Therefore, in some embodiments, the term base station 170 may also refer to modules on the network side that perform processing operations, such as resource allocation (scheduling), message generation, and encoding/decoding, and that are not necessarily part of the equipment housing the antennas of the base station 170. The modules may also be coupled to other base stations. In some embodiments, the base station 170 may actually be a plurality of base stations that are operating together to serve the UE 110, e.g. through coordinated multipoint transmissions. Also, the term "base station" is used herein to refer to a network device, i.e. a device on the network side.

The base station 170 includes a transmitter 252 and a receiver 254 coupled to one or more antennas 256. Only one antenna 256 is illustrated. The transmitter 252 and the receiver 254 may be integrated as a transceiver. The base station 170 further includes a processor 260 for performing operations including those related to preparing a transmission for downlink transmission to the UE 110, and those related to processing uplink transmissions received from the UE 110. Processing operations related to preparing a transmission for downlink transmission include operations such as encoding, modulating, precoding (e.g. MIMO precoding), and generating the symbols for downlink transmission. Processing operations related to processing uplink transmissions include demodulating and decoding the received symbols. In some embodiments, the processor 260 generates signaling to configure parameters of the frame structures disclosed herein. In some embodiments, the signaling may include signaling that is common to all UEs or a group of UEs served by the base station 170, and/or UE-specific signaling. As one example, the signaling may include signaling having an indication that configures the direction of communication for time durations within a frame, and signaling having an indication that configures a specific direction of communication for specific UEs for any time durations indicated as "flexible", as described in more detail below. The signaling is sent by the transmitter 252. The base station 170 further includes a scheduler 253, which may schedule uplink and downlink transmissions in the defined frames. In some embodiments, the scheduler 253 may generate some or all of the signaling described as being generated by the processor 260. The base station 100 further includes a memory 258 for storing information and data.

Although not illustrated, the processor 260 may form part of the transmitter 252 and/or receiver 254. Also, although not illustrated, the processor 260 may implement the scheduler 253.

The processor 260, the scheduler 253, and the processing components of the transmitter 252 and receiver 254 may each be implemented by the same or different one or more processors that are configured to execute instructions stored in a memory (e.g. in memory 258). Alternatively, some or all of the processor 260, the scheduler 253, and the processing components of the transmitter 252 and receiver 254 may be implemented using dedicated circuitry, such as a programmed field-programmable gate array (FPGA), a graphical processing unit (GPU), or an application-specific integrated circuit (ASIC).

The UE 110 also includes a transmitter 201 and a receiver 203 coupled to one or more antennas 204. Only one antenna 204 is illustrated. The transmitter 201 and the receiver 203 may be integrated as a transceiver, e.g. transceiver 202 of FIG. 2. The UE 110 further includes a processor 210 for performing operations including those related to preparing a transmission for uplink transmission to the base station 170, and those related to processing downlink transmissions received from the base station 170. Processing operations related to preparing a transmission for uplink transmission include operations such as encoding, modulating, and generating the symbols for transmission. Processing operations related to processing downlink transmissions include demodulating and decoding the received symbols. The processor 210 may extract signaling from a downlink transmission (e.g. by decoding the signaling) in order to determine parameters of the frame structures indicated by the network (e.g. to determine the communication direction configured for different time durations within a frame, etc.), as well as to determine the scheduling of uplink and downlink transmissions. The transmission or reception of a symbol is in accordance with a scheduling grant issued by the scheduler 253. The base station 100 further includes a memory 208 for storing information and data.

Although not illustrated, the processor 210 may form part of the transmitter 201 and/or receiver 203.

The processor 210, and the processing components of the transmitter 201 and receiver 203 may each be implemented by the same or different one or more processors that are configured to execute instructions stored in a memory (e.g. in memory 208). Alternatively, some or all of the processor 210, and the processing components of the transmitter 201 and receiver 203 may be implemented using dedicated circuitry, such as a FPGA, a GPU, or an ASIC.

In some embodiments, the UE 110 is not necessarily a smartphone, but could instead be any terminal device, e.g. an Internet of Things (IoT) device, a wearable device, a vehicular device, a vehicle-mounted device, vehicle on-board equipment, etc.

The base station 170 and the UE 110 may include other components, but these have been omitted for the sake of clarity.

Transmission in a Frame

A frame structure defines a time domain signal transmission structure, e.g. to allow for timing reference and timing alignment of basic time domain transmission units. Wireless communication between UEs and one or more base stations occur on time-frequency resources that may be governed by a frame structure.

Figure 6:
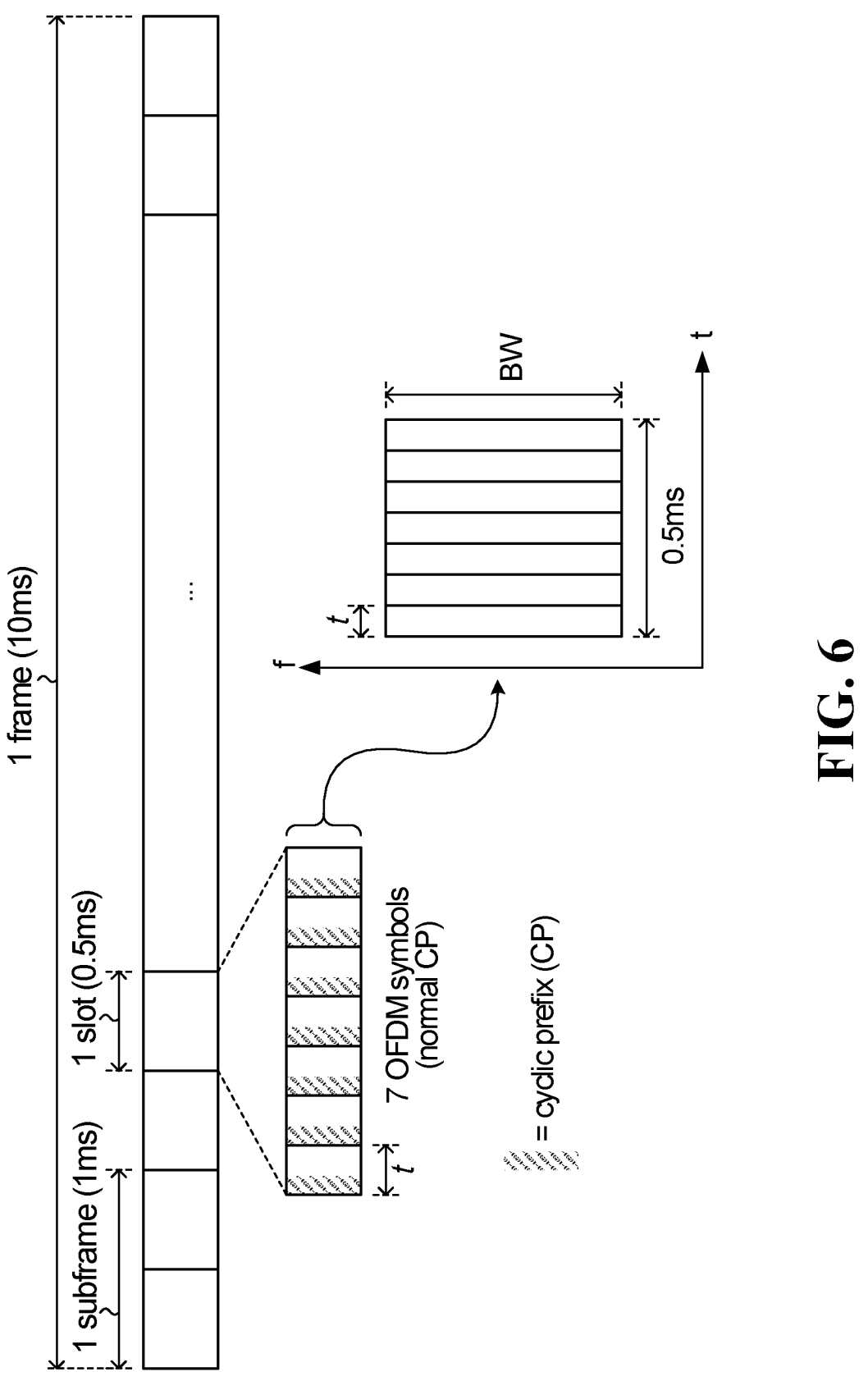
FIG. 6 illustrates an example frame structure in LTE.

One example of a frame structure is illustrated in FIG. 6. The frame structure in FIG. 6 is one example type of frame structure in LTE. The frame structure in FIG. 6 has the following structure: each frame is 10 ms in duration; each frame has 10 subframes, which are each 1 ms in duration; each subframe includes two slots, each of which is 0.5 ms in duration; each slot is for transmission of 7 OFDM symbols (assuming normal CP); each OFDM symbol has a symbol duration t and a particular bandwidth (or partial bandwidth or bandwidth partition) related to the number of subcarriers and subcarrier spacing. The frame structure of FIG. 6 places limitations on time domain scheduling and duration of symbols, e.g. time domain granularity is limited by OFDM symbol duration, and limits are placed on the length of the CP.

Although not directly shown in FIG. 6, the frame structure of FIG. 6 also has a limitation in that it does not support FD communications. Instead, there are three frame structure types supported in LTE: (1) Type 1, which supports FDD communications; (2) Type 2, which supports TDD communications; and (3) Type 3, which is only applicable to License Assisted Access (LAA) transmissions. None of these frame structure types supports FD communication.

Figure 7:
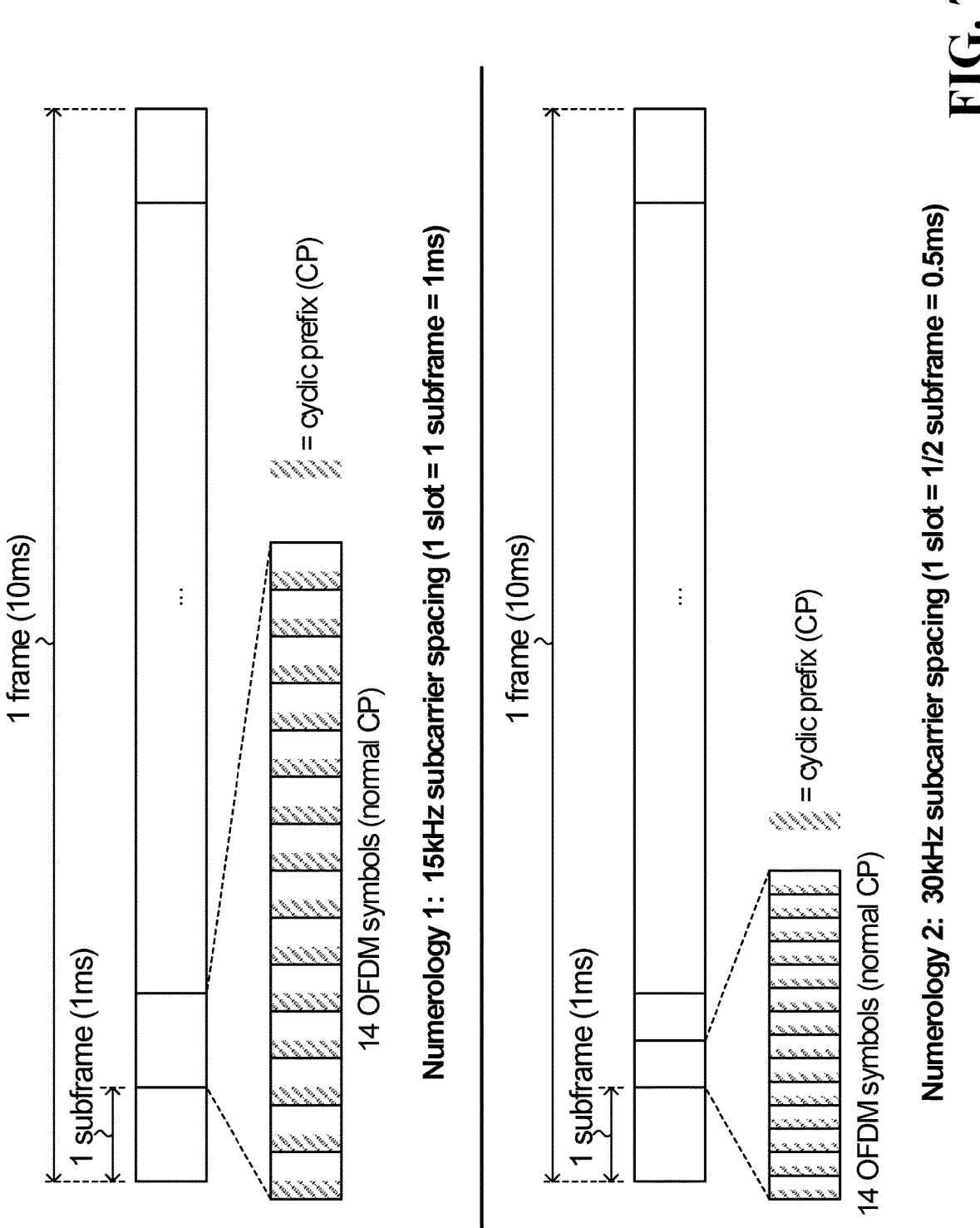
FIG. 7 illustrates an example frame structure in NR.

Another example of a frame structure is that defined in NR. In NR, multiple subcarrier spacings are supported, each subcarrier spacing corresponding to a respective numerology. The frame structure depends on the numerology, but in any case the frame length is set at 10 ms, and consists of ten subframes of 1 ms each. A slot is defined as 14 OFDM symbols (assuming normal CP), and slot length depends upon the numerology. For example, FIG. 7 illustrates the NR frame structure for normal CP 15 kHz subcarrier spacing ("numerology 1") and the NR frame structure for normal CP 30 kHz subcarrier spacing ("numerology 2"). For 15 kHz subcarrier spacing a slot length is 1 ms, and for 30 kHz subcarrier spacing a slot length is 0.5 ms.

Figure 8:
FIG. 8 illustrates an example of a slot in NR configured with uplink, downlink, and flexible symbols.

Although not shown in FIG. 7, the NR frame structure also has a limitation in that it does not support FD communications. Only FDD or TDD communications are supported. For TDD communications, signaling may be used to configure uplink, downlink, and flexible transmission durations within a slot. A "flexible" transmission duration is one in which the communication direction may be uplink or downlink and can be set on a UE-specific basis. For example, FIG. 8 illustrates one slot of a NR TDD frame, which includes 14 OFDM symbols (assuming normal CP length). Cell common signaling (referred to alternatively as broadcast signaling) is used to configure the first three symbols as downlink ("D"), the last two symbols as uplink ("U"), and the remaining symbols as flexible ("F"). Switching gaps (guard periods) are not illustrated in FIG. 8, although they would be present whenever a transmission switches from uplink to downlink, or vice versa. Additional signaling may be used to set one or more of the flexible ("F") symbols as uplink or as downlink for one or more particular UEs.

FIG. 8 is only one possible example configuration, and other communication direction patterns (downlink/flexible/uplink symbols) are possible. For example, the number and/or location of downlink, uplink, and flexible symbols in a slot may be different than that shown in FIG. 8. However, in any case, each symbol can only be uplink or downlink (or not used), not both uplink and downlink. That is, FD communication is not supported. In some implementations, dynamic signaling is possible to override the downlink/uplink/flexible configuration set using higher layer signaling. For example, higher layer signaling may be used to establish the configuration shown in FIG. 8 for a plurality of slots. However, DCI may be used to override (i.e. change) the configuration for one or more particular slots for a group of UEs, e.g. change the number and/or location of downlink, uplink, and flexible symbols in the slot for a group of UEs.

Therefore, the NR frame structure may have more flexibility than the LTE frame structure, e.g. due to the provision of "flexible" symbols in TDD. However, the NR frame structure still has notable limitations, e.g. FD communication is not supported, and a single frame structure is configured for either FDD or TDD communication, not both.

Embodiments of frame structures are instead disclosed herein that support FD, FDD, and TDD communications. In some embodiments, there are defined two separate and independent frame structures: a frame structure for reception and a frame structure for transmission. As mentioned earlier, "Reception" and "Transmission" as used herein is from the perspective of the UE. For example, in a UE/base station communication, reception is downlink and transmission is uplink. Therefore, when "reception frame structure" is used herein, it may interchangeably be called a "downlink frame structure" in the context of wireless communication between a network device (e.g. base station) and UEs. In this context "reception" may be replaced with "downlink". Similarly, when "transmission frame structure" is used herein, it may interchangeably be called "uplink frame structure" in the context of wireless communication between a network device and UEs. In this context, "transmission" may be replaced with "uplink".

Separate Transmission and Reception Frame Structures

As mentioned above, in some embodiments, there are defined two separate and independent frame structures: a frame structure for reception and a frame structure for transmission. The frame structure for reception will be called a reception frame structure, and a frame of the reception frame structure will be referred to as a reception frame. The frame structure for transmission will be called a transmission frame structure, and a frame of the transmission frame structure will be referred to as a transmission frame. Each frame of the reception frame structure may be configured to have a plurality of time durations in which a communication direction is configured. In some embodiments, at least one of the time durations is configured for receiving transmissions (e.g. in the downlink), and one or more of the other time durations may be flexible. A flexible time duration is a time duration in which the communication direction may be configured as transmission and/or reception, possibly on a UE-specific basis. For example, a UE may be configured to either transmit or receive, or both transmit and receive during some or all of the flexible time duration, depending upon the capabilities of the UE. UE-specific control signaling may be used to configure, for each UE, whether the UE is to transmit or receive, or both transmit and receive, or do neither for a particular flexible time duration. Similarly, a transmission frame of the transmission frame structure may also be configured to also have a plurality of time durations in which a communication direction is configured. In some embodiments, at least one of the time durations is configured for sending transmissions (e.g. in the uplink), and one or more of the other time durations may be flexible. UE-specific control signaling may be used to configure, for each UE, whether the UE is to transmit or receive, or both transmit and receive, or do neither for a particular flexible time duration in a transmission frame.

In some embodiments, the reception frame structure is associated with a first frequency band and/or a first frequency carrier and/or a first serving cell and/or a first bandwidth part (BWP) and/or a first base station (e.g. TRP), and the transmission frame structure is associated with a respective second frequency band and/or second frequency carrier and/or second serving cell and/or second BWP and/or second base station (e.g. TRP). In some embodiments, the first frequency band or first frequency carrier or first serving cell or first BWP may partially overlap with the respective second frequency band or second frequency carrier or second serving cell or second BWP. In some embodiments, the first frequency band or first frequency carrier or first serving cell or first BWP may equal the respective second frequency band or second frequency carrier or second serving cell or second BWP.

Figure 9:
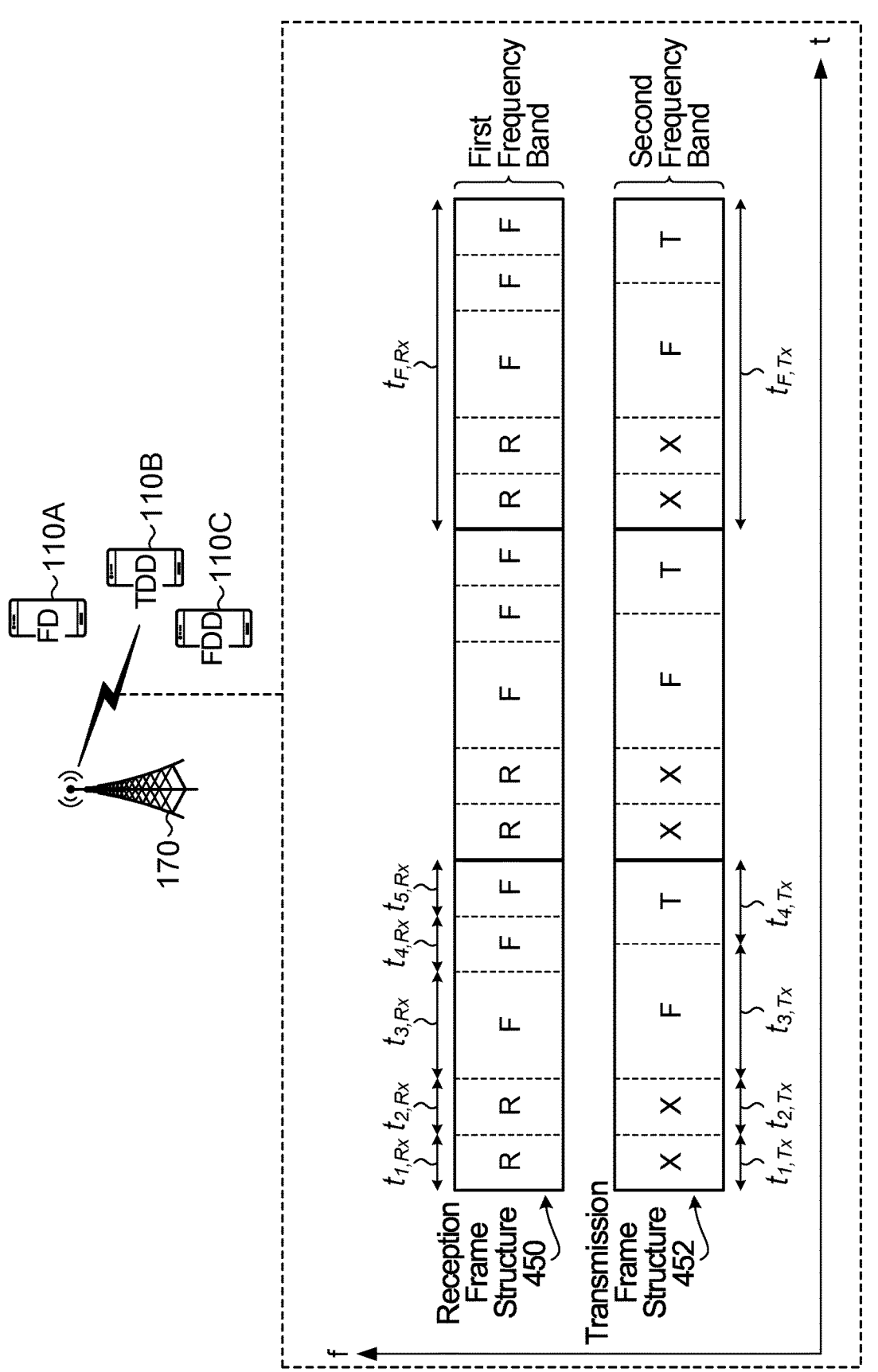

FIG. 9 illustrates an example reception frame structure 350 and transmission frame structure 352, according to one embodiment. Base station 170 wirelessly communicates with three UEs 110A, 110B, and 110C. UE 110A has the capability to communicate with the base station 170 using FD communication. UE 110B is a legacy device configured to communicate with the base station 170 via TDD communication. UE 110C is also a legacy device, configured to communicate with the base station 170 via FDD communication.

The wireless communications between base station 170 and UEs 110A, 110B, and 110C are governed by two separate frame structures: a reception frame structure 350, and a transmission frame structure 352.

Three frames of the reception frame structure 350 are illustrated in FIG. 9, each frame having a same duration $t_{F,Rx}$. A frame of the reception frame structure 350 will be referred to as a reception frame. Each reception frame includes five time durations in which a respective communication direction is configured. The first time duration $t_{1,Rx}$ is configured for reception, i.e. for a downlink transmission, as indicated by the letter "R". The second time duration $t_{2,Rx}$ is also configured for reception, i.e. for a downlink transmission, as indicated by the letter "R". In the reception time durations, i.e. in time durations 1 and 2, only downlink transmission is permitted. A UE may not send an uplink transmission on the reception frame during time durations 1 and 2. The third time duration $t_{3,Rx}$ is configured as flexible, as indicated by the letter "F". In a flexible time duration, the direction of communication (transmission versus reception) is flexible and may be configured on a UE-specific basis. For example, during some or all of a flexible time duration, a UE may be configured for reception (i.e. receive a downlink transmission), or for transmission (i.e. send an uplink transmission), or for both reception and transmission, depending upon the capabilities of the UE. In some or all of a flexible duration, a UE may sometimes be configured to neither transmit nor receive. In some implementations, a UE may be configured to switch reception/transmission within a flexible duration, e.g. receive a downlink transmission at the start of the flexible duration, followed by a switching gap, followed by sending an uplink transmission just prior to the end of the flexible duration.

The fourth time duration $t_{4,Rx}$ of the reception frame is also configured as flexible, as indicated by the letter "F". The fifth time duration $t_{5,Rx}$ is also configured as flexible, as indicated by the letter "F".

The direction of communication respectively configured for each time duration in a frame defines a communication direction pattern for the frame. For example, the communication direction pattern for a reception frame in FIG. 9 is RRFFF.

In one example, time durations 1 and 2 of a reception frame (labelled "R") may be used to transmit downlink information to each of UEs 110A, 110B, and 110C. The downlink information may be broadcast, multicast, or sent in UE-specific transmissions. The downlink information sent in some or all of time durations 1 and 2 of a reception frame may be important information that is protected, in part, by not allowing any uplink transmissions in time durations 1 and 2 of the reception frame. In some embodiments, downlink control signaling may be sent from the base station 170 during time durations 1 and 2 of the reception frame. Examples of downlink information sent during time durations 1 and 2 of the reception frame may include: a primary synchronization signal (PSS), and/or a secondary synchronization signal (SSS), and/or a master information block (MIB), and/or a system information block (SIB), and/or a paging channel (PCH).

In one example, UE 110A has FD communication capability, and so the base station 170 may configure the UE 110A to both transmit and receive on each of flexible time durations 3, 4, and 5 labeled "F" in a reception frame. UE 110B is configured for TDD communication, and (as an example) the base station 170 may configure the UE 110B to receive a downlink communication in time duration 3 of the reception frame, have a switching gap in time duration 4 of the reception frame, and perform an uplink communication in time duration 5 of the reception frame. UE 110C is configured for FDD communication and so is only config-
ured to receive downlink communications in the reception
frame. As an example, the base station 170 may configure
UE 110C to receive downlink transmissions in time dura-
tions 3 and 4 of the reception frame and receive no downlink
transmissions in time duration 5 of the reception frame.

Three frames of the transmission frame structure 352 are
also illustrated in FIG. 9, each frame having a same duration
$t_{F,Tx}$. A frame of the transmission frame structure 352 will be
referred to as a transmission frame. The transmission frames
are illustrated as time aligned with the reception frames in
FIG. 9, i.e. the start of each transmission frame is illustrated
as occurring at the same time as the start of a reception
frame. In general this might not be the case, as discussed
later. Any timing offset (e.g. timing advance) is omitted from
FIG. 9 for ease of explanation, but in general a timing offset
(e.g. timing advance) may be present for uplink transmis-
sions.

Each transmission frame includes four time durations in
which a respective communication direction is configured.
The first time duration $t_{1,Tx}$ is configured as reserved, as
indicated by the letter "X". This means that neither a
transmission nor a reception can occur in the transmission
frame during time duration $t_{1,Tx}$. Similarly, the second time
duration $t_{2,Tx}$ is also configured as reserved, as indicated by
the letter "X". The third time duration $t_{3,Tx}$ is configured as
flexible, as indicated by the letter "F". In a flexible time
duration, the direction of communication (transmission ver-
sus reception) is flexible and may be configured on a
UE-specific basis. For example, during some or all of a
flexible time duration, a UE may be configured for reception
(i.e. receive a downlink transmission), or for transmission
(i.e. send an uplink transmission), or for both reception and
transmission, depending upon the capabilities of the UE. In
some or all of a flexible duration, a UE may sometimes be
configured to neither transmit nor receive. In some imple-
mentations, a UE may be configured to switch reception/
transmission within a flexible duration, e.g. receive a down-
link transmission at the start of the flexible duration,
followed by a switching gap, followed by sending an uplink
transmission just prior to the end of the flexible duration.

The fourth time duration $t_{4,Tx}$ of the transmission frame is
configured for transmission, i.e. for an uplink transmission,
as indicated by the letter "T". In the fourth time duration,
only an uplink transmission is permitted on the transmission
frame. A UE may not receive a downlink transmission on the
transmission frame in time duration 4. In some embodi-
ments, a time duration configured as a transmission duration
"T" may be reserved for UE transmission of important
uplink information that the base station needs to receive, in
which case the corresponding time duration in the reception
frame structure 350 may be reserved "X" to prohibit trans-
mission/reception on the reception frame during that time
duration to help mitigate interference.

As mentioned above, the direction of communication
respectively configured for each time duration in a frame
defines a communication direction pattern for the frame. The
communication direction pattern for a transmission frame in
FIG. 9 is XXFT.

In one example, UE 110A has FD communication capa-
bility, and so the base station 170 may configure the UE
110A to both transmit and receive on flexible time duration
3 labeled "F" in a transmission frame. UE 110B is config-
ured for TDD communication, and (as an example) the base
station 170 may configure the UE 110B to receive a down-
link communication in a first portion of time duration 3 and
have a switching gap in a second portion of time duration 3 just prior to the beginning of time duration 4 of the trans-
mission frame. UE 110C is configured for FDD communi-
cation and so is only configured to transmit uplink commu-
nications in the transmission frame. All of UEs 110A, 110B,
and 110C may be configured to transmit information in the
uplink during time duration 4 of the transmission frame
structure. Even though the UE 110A has FD communication
capability, it is not configured to receive information in the
downlink in time duration 4 because time duration 4 of the
transmission frame is for uplink transmissions only.

In the example of FIG. 9, the transmission and reception
frame structures 350 and 352 are configured to be on
separate non-overlapping frequency bands, which are
labelled in FIG. 9 as the "first frequency band" and the
"second frequency band". The FDD communication of UE
110C is accommodated because all of its downlink commu-
nication is on the first frequency band (the reception frames),
and all of its uplink communication is on the second
frequency band (the transmission frames). In general, the
first and second frequency bands may partially or fully
overlap, in which case UEs communicating using FDD
might not be accommodated.

In the example of FIG. 9, time durations 1 and 2 of a
reception frame are time-aligned with time durations 1 and
2 of a corresponding transmission frame. Also, in the
example of FIG. 9, no transmission can occur in time
durations 1 and 2 of the transmission frame, as indicated by
"X". This helps protect the downlink transmission in time
durations 1 and 2 of the reception frame, because interfer-
ence from competing transmission is mitigated. However, if
the first and second frequency bands are completely separate
(no frequency overlap), as illustrated in FIG. 9, then it might
not be necessary to prohibit transmissions on time durations
1 and 2 of the transmission frame because the transmissions
would be on different frequency resources from the down-
link transmissions in the reception frame. Although the first
and second frequency bands are illustrated as non-overlap-
ping, they may partially or fully overlap depending upon the
configuration.

In FIG. 9, the frame duration of a reception frame is equal
to a frame duration of a transmission frame, i.e. $t_{F,Rx}=t_{F,Tx}$.
However, in general this need not be the case. Also, a frame
duration may change between frames. For example, the time
duration $t_{F,Rx}$ of one reception frame may be different from
the time duration $t_{F,Rx}$ of another reception frame in the
reception frame structure 350. Similarly, the time duration
$t_{F,Tx}$ of one transmission frame may be different from the
time duration $t_{F,Tx}$ of another transmission frame in the
transmission frame structure 352.

In FIG. 9, each reception frame has the same configured
time durations: five time durations, each of a particular
length, and each reception frame configured with the com-
munication direction pattern RRFFF. However, in general
this need not be the case. Different reception frames may
have a different number of time durations and/or time
durations of different lengths, and/or the communication
direction pattern configuration may change between recep-
tion frames. The same comment applies to the frames of the
transmission frame structure 352. That is, different trans-
mission frames may have a different number of time dura-
tions and/or time durations of different lengths, and/or the
communication direction pattern configuration may change
between transmission frames. Some or all of the transmis-
sion frames might not have a reserved time duration "X"
and/or might not necessarily have a dedicated transmission
time duration "T" (i.e. the presence of "X" and "T" are
optional in the transmission frame structure 352). However, in some embodiments a frame of the transmission frame structure 352 does not include a dedicated reception time duration "R", as this is a feature of the reception frame structure 350 and serves to distinguish the reception frame structure 350 from the transmission frame structure 352. In some embodiments, the reception frame structure 350 must include at least one frame with a dedicated reception time duration "R". In some embodiments, the reception frame structure 350 must include at least one frame with a dedicated reception time duration "R" and a dedicated flexible time duration "F". In some embodiments, the reception frame structure 350 cannot include a dedicated transmission time duration "T". In some embodiments, "R" and "T" cannot be mixed in a same frame structure, i.e. whether it be the reception frame structure 350 or the transmission frame structure 352, there cannot be, within a single same frame structure, both a dedicated reception time duration "R" and a dedicated transmission time duration "T".

Figure 10:
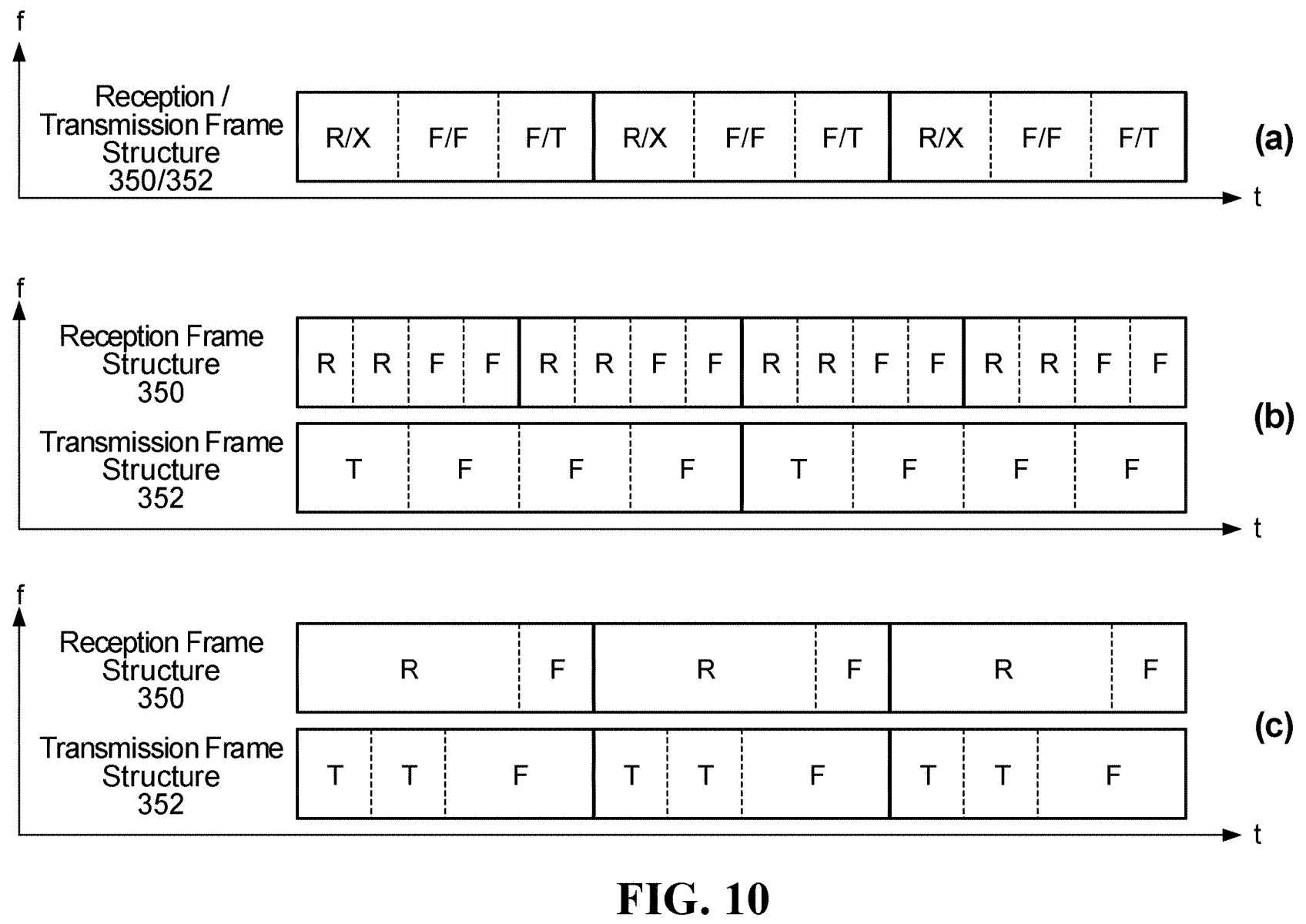

For the sake of example, FIG. 10 illustrates some alternative configurations for the reception frame structure 350 and the transmission frame structure 352. Any timing offset (e.g. timing advance) between a reception frame and a transmission frame is omitted for the sake of clarity.

In alternative configuration (a) of FIG. 10, three frames are illustrated. The reception and transmission frame structures 350 and 352 are configured to be on the exact same (coterminous) frequency resources, i.e. fully overlap in the frequency domain. The time durations in each of the frames in each of the frame structures are also coterminous, i.e. fully overlap. Each frame has three time durations. The first time duration in a frame is for reception "R" in the reception frame structure 350 and is reserved "X" in the transmission frame structure 352. No transmission or reception is permitted in the first time duration of the transmission frame so as to avoid interference with the reception in the first time duration of the reception frame. The second time duration is flexible for both the reception frame and the transmission frame. The third time duration is flexible for the reception frame and is dedicated for only transmission in the transmission frame. The base station 170 configures and schedules uplink and downlink transmissions for UEs 110A, 110B, and 110C in a way that avoids or mitigates interference. FDD communication for UE 110C might not be possible, unless different frequency ranges within the same frame are dedicated for uplink and downlink communication for UE 110C. The first time duration of each frame is reserved only for downlink communication, e.g. to all of UEs 110A to 110C. The downlink communication in the first time duration occurs as part of the reception frame structure 350.

In alternative configuration (b) of FIG. 10, the reception and transmission frame structures 350 and 352 are located on non-overlapping frequency resources. Four reception frames are illustrated and two transmission frames are illustrated. Each transmission frame is twice the length of a reception frame, e.g. the subcarrier spacing of the symbols in the transmission frame may be half the subcarrier spacing of the symbols in the reception frame. Different time durations and communication direction patterns are configured for the reception and transmission frames. In the illustrated example, a reception frame and a transmission frame each has four time durations, but the time duration in a reception frame is half the length of a time duration in a transmission frame. Each reception frame is configured with the communication direction pattern RRFF, and each transmission frame is configured with the communication direction pattern TFFF.

In alternative configuration (c) of FIG. 10, the reception and transmission frame structures 350 and 352 are located on non-overlapping frequency resources, the duration of a reception frame equals the duration of a transmission frame, and the start of a transmission frame is time-aligned with the start of a corresponding reception frame. However, the lengths of the time durations are different in a reception frame compared to a transmission frame and the number of time durations in a reception frame is not equal to the number of time durations in a transmission frame. Specifically, in this example, a reception frame has two time durations in which a communication direction is configured (to result in the communication direction pattern RF), and a transmission frame has three time durations in which a communication direction is configured (to result in communication direction pattern TTF).

A time duration in a reception frame of reception frame structure 350 and/or in a transmission frame of transmission frame structure 352 may be defined in terms of: absolute time, and/or number of symbols (e.g. a time duration may span a particular number of one or more symbols), and/or number of slots if defined (e.g. a time duration may span a particular number of one or more slots), and/or number of subframes if defined (e.g. a time duration may span a particular number of one or more subframes).

The configurations in FIG. 10 are only examples to help illustrate the principle that many different and independent configurations of the reception frame structure 350 and the transmission frame structure 352 are possible. Parameters independently configured for the reception frame structure 350 and the transmission frame structure 352 may include:

(1) Subcarrier spacing (SCS): The subcarrier spacing of symbols in the reception frame structure 350 may be configured independently from the subcarrier spacing of symbols in the transmission frame structure 352. Therefore, the subcarrier spacing in a reception frame may be different from the subcarrier spacing in a transmission frame, although this need not be the case. Example configuration (b) in FIG. 10 may be a result of the subcarrier spacing of each transmission frame being half the subcarrier spacing of each reception frame. If the subcarrier spacing between a reception frame and a transmission frame is different, the difference does not necessarily have to scale by a factor of two, e.g. if more flexible symbol durations are implemented using IDFT instead of FFT. Additional examples of frame structures with different subcarriers spacings are also discussed in more detail later.

(2) Frame length: The frame length of one, some, or all of the frames in the reception frame structure 350 may be configured independently of the frame length of one, some, or all of the frames in the transmission frame structure 352. Therefore, a frame length of a reception frame may be different from a frame length of a transmission frame, although this need not be the case. Also, different reception frames within the reception frame structure 350 may be configured to have different lengths, and/or different transmission frames within the transmission frame structure 352 may be configured to have different lengths.

(3) Number of time durations within a frame: The number of time durations for which a respective communication direction is configured may be different for a reception frame compared to a transmission frame. For example, configuration (c) in FIG. 10 illustrates an example in which a reception frame has two time durations in which a communication direction is configured (to result in the communication direction pattern RF), and a transmission frame has three time durations in which a communication direction is configured (to result in communication direction pattern TTF). Also, different reception frames within the reception frame structure 350 may have a different number of time durations, and/or different transmission frames within the transmission frame structure 352 may have a different number of time durations.

(4) Length of time durations within a frame: The length of a time duration in a frame for which a communication direction is configured may be different for a reception frame compared to a transmission frame. For example, configuration (a) in FIG. 10 illustrates an example in which each time duration in a reception frame is the same length as a time duration in a transmission frame, whereas configuration (b) in FIG. 10 illustrates an example in which each time duration in a reception frame is a different length compared to a time duration in a transmission frame. Also, time durations of different lengths may be configured within a same reception frame and/or within a same transmission frame, e.g. as is the case in configuration (c) of FIG. 10. Also, different reception frames within the reception frame structure 350 may have one or more time durations of different lengths, and/or different transmission frames within the transmission frame structure 352 may have time durations of different lengths.

(5) The frequency band and/or frequency carrier and/or serving cell and/or BWP and/or base station (e.g. TRP) that the reception frame structure 350 is associated with may be configured independently from (and possibly be different than) the frequency band and/or frequency carrier and/or serving cell and/or BWP and/or base station (e.g. TRP) the transmission frame structure 352 is associated with.

Parameters of a frame structure not signaled to the UE may be predefined, e.g. fixed in a standard, or predefined based on an application scenario (e.g. one configuration for low latency applications and another different configuration for delay tolerant applications).

In addition to parameters (1) to (5) above, another parameter that may be configurable, e.g. on a UE-specific basis, is whether a UE is to transmit, or receive, or both transmit and receive, or neither transmit nor receive during some or all of a time duration that is configured as flexible "F".

The parameters of the reception frame structure 350 and the transmission frame structure 352 may each be configured for a UE via control signaling, e.g. via higher layer signaling (such as radio resource control (RRC) signaling), and/or medium access control (MAC) layer information, and/or via dynamic signaling (such as downlink control information (DCI) signaling). In some embodiments, the signaling that configures the reception frame structure 350 and the transmission frame structure 352 may be located together, e.g. bits all in a same field with a first portion of the field configuring the reception frame structure 350 and a second portion of the field configuring the transmission frame structure 352. In other embodiments, the signaling that configures the reception frame structure 350 and the transmission frame structure 352 may be separate, e.g. one field used for configuring the reception frame structure 350, and another different field for configuring the transmission frame structure 352.

In some embodiments, the configuration of the reception frame structure 350 and the transmission frame structure 352 may be signaled by cell common signaling and/or UE specific signaling (such as UE-specific RRC or UE specific MAC signaling) and/or physical layer signaling (such as DCI).

In some embodiments, cell common signaling, which is received and decoded by all UEs being served by the base station, is used to indicate the parameters of the frame structure that are the same for all UEs communicating on the frame structure. Such parameters may include: frame duration of the reception and transmission frame structures, and/or location and length of time durations in one, some, or all of the reception and transmission frames, and/or whether a particular time duration is for reception "R", transmission "T", reserved "X", or flexible "F". Alternatively, one or more of the foregoing parameters may instead be predefined, e.g. fixed by a standard. UE-specific signaling may be used to configure, for each UE, whether that UE is to transmit, receive, both transmit and receive, or do neither for each flexible "F" time duration in each frame of each frame structure 350 and 352. The UE specific signaling configures the direction of communication for each UE based on the capability of that UE. For example, if a UE has FD communication capability, then that UE may be configured for concurrent transmission and reception over a particular flexible time duration "F". However, if another UE is configured for TDD communication, then that UE may be configured to not transmit and receive at the same time during a particular flexible time duration "F". In some embodiments, the UE-specific signaling may be in DCI or higher-layer signaling, such as RRC signaling or MAC layer signaling. In general, in some embodiments a first signaling that is not UE-specific may be used to configure some parameters of a reception and/or transmission frame structure, and a second signaling that is UE-specific may be used to configure a direction of communication for one or more UEs communicating on the frame structures.

In some embodiments, the reception frame structure 350 and/or transmission frame structure 352 may be configured differently for different services, possibly even for a same UE. For example, a UE that is a smart watch may be transmitting heart rate information to the base station, but may also be streaming a video. A flexible time duration "F" in a transmission frame and/or reception frame may be configured for transmission (uplink) for the service that transmits heart rate information, and a flexible time duration "F" in a transmission frame and/or reception frame may be configured for reception (downlink) for the service that is video streaming. In some embodiments, the communication direction pattern of a reception frame and/or transmission frame may be configured differently for different services, e.g. a reception frame may have the pattern RFFFF for one service (e.g. heart rate monitoring), and may have the pattern RRRRF for another service (e.g. for video streaming).

In some embodiments, the reception frame structure 350 and/or transmission frame structure 352 may be configured differently for different UEs, in which case UE-specific signaling is used to configure the frame structures, e.g. UE-specific RRC signaling, MAC layer signaling, and/or physical layer signaling (such as UE-specific DCI). In some embodiments, the reception frame structure 350 and/or transmission frame structure 352 may be configured differently for different groups of UEs, in which case group-common signaling (e.g. group common DCI) may be used to configure the frame structures.

In one example, a predefined set of different possible communication direction patterns are predetermined in advance, and group common DCI is used to dynamically indicate/select one of the predefined communication direction patterns. For example, FIG. 11 illustrates a reception frame and a transmission frame each having ten time durations in which a respective communication direction may be configured. The communication direction pattern actually configured for the ten time durations is dynamically indicated by selecting one of the six predefined patterns in Table 1 (for the reception frame) and one of the three predefined patterns in Table 2 (for the transmission frame). For example, if index 1 of Table 1 is indicated in DCI, then the communication direction pattern for the reception frame is RFFFFRFFFF, and if index 2 of Table 2 is indicated in DCI, then the communication direction pattern for the transmission frame is FFFFFFFFFF.

In some embodiments, UE-specific RRC signaling may indicate certain parameters of the reception frame structure 350 and/or the transmission frame structure 352 (e.g. which time durations are configured as flexible "F"), and DCI signaling may indicate whether the time duration configured as flexible "F" is to be used by the UE for reception (e.g. downlink) and/or transmission (e.g. uplink).

In some embodiments, one or more parameters may be explicitly signaled or predefined separately for both the reception frame structure 350 and the transmission frame structure 352. In other embodiments, one or more parameters may be explicitly signaled for the reception frame structure 350, and not for the transmission frame structure 352 (or vice versa). For example, the reception frame structure 350 may be configured using parameters explicitly signaled to the UE, and the configuration of the transmission frame structure 352 may be predefined based on the configured reception frame structure 350. For example, signaling may be received by a UE indicating a reception frame structure 350 having a particular frame length, a particular number and length of time durations within each reception frame, and indicating the communication direction configured for each time duration, e.g. "R", "F", or "X". The UE may then derive the configuration of the transmission frame structure 352 based on a predefined relationship between the reception frame structure 350 and the transmission frame structure 352. For example, it may be predefined that the transmission frame structure 352 is the same configuration as the reception frame structure 350, but with the following two differences known by the UE: (i) the transmission frame structure 352 is to be located on a neighboring non-overlapping frequency band immediately adjacent to the frequency band on which the reception frame structure 350 is located, and (ii) each time duration in the transmission frame structure 352 that corresponds to a time duration configured as "R" in the reception frame structure 350 is instead configured as a transmission duration "T" in the transmission frame structure 352. In some embodiments, the subcarrier spacing is predefined or configured (e.g. via cell common signaling) to be the same in transmission frame structure 352 as in the reception frame structure 350.

In some embodiments, signaling decodable by a plurality of UEs (e.g. cell common signaling) is used to indicate the configurable parameters of the reception frame structure 350, and the transmission frame structure 352 is either predefined based on a known relationship between the transmission frame structure 352 and the configured reception frame structure 350, or perhaps the transmission frame structure 352 also has its parameters configured using signaling decodable by the plurality of UEs.

In some embodiments, the reference frame structure 350 and the transmission frame structure 352 may be configured to have the same subcarrier spacing, whereas in other embodiments the reference frame structure 350 and the transmission frame structure 352 may be configured to have different subcarrier spacings. In some embodiments, the subcarrier spacing is configured using cell common signaling.

Figure 12:
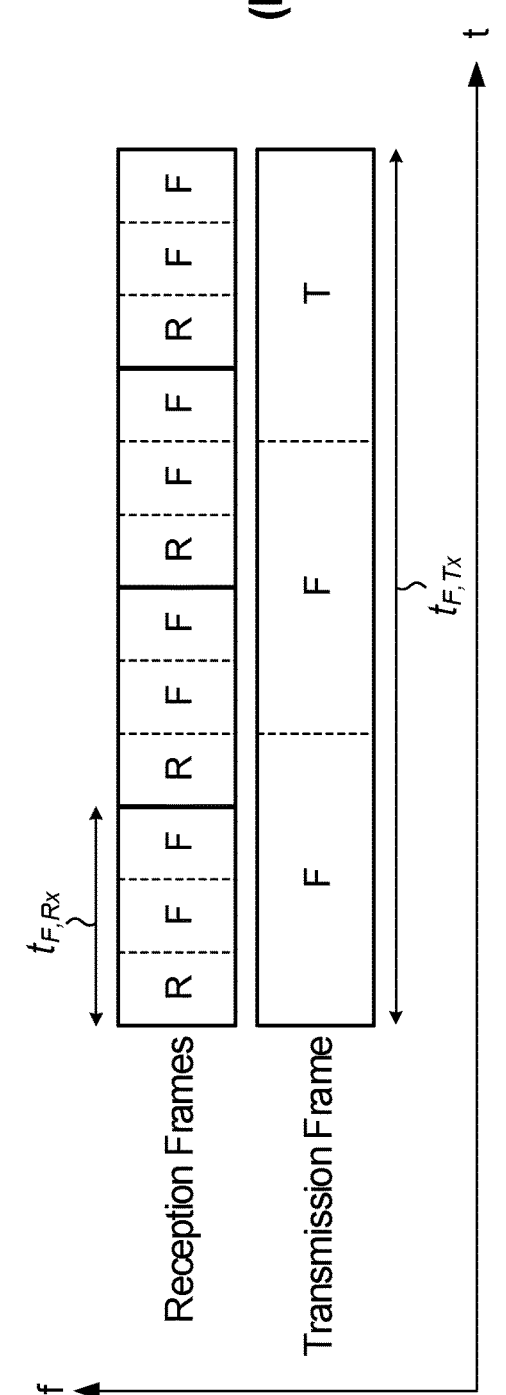

A few examples of reception and transmission frame structures with different subcarrier spacings are illustrated in FIG. 12. In configuration (a) of FIG. 12, a reception frame and a transmission frame each have a same absolute frame length $t_{F,Rx} = t_{F,Tx}$, but the subcarrier spacing of the reception frame is half the subcarrier spacing of the transmission frame. There are four time durations in the reception frame and eight time durations in the transmission frame. Each time duration may be a symbol, slot, or subframe, depending upon the implementation. Configuration (a) of FIG. 12 illustrates the principle that in some embodiments a frame length of a reception frame and a transmission frame may be the same, in which case if the subcarrier spacing is different the number of symbols (and possibly the number of slots and/or subframes, if defined) will be different in the reception frame as compared to the transmission frame.

In configuration (b) of FIG. 12, the subcarrier spacing of the reception frame is four times larger than the subcarrier spacing of the transmission frame, but the number of time durations in a frame is configured to be the same for both a reception frame and a transmission frame. Specifically, in the illustrated example of configuration (b) of FIG. 12, the number of time durations in a reception frame and the number of time durations in a transmission frame is equal to three. Therefore, the reception frame and the transmission frame have different frame lengths, i.e. $t_{F,Rx} \neq t_{F,Tx}$. There is only one transmission frame for every four reception frames. Each time duration in a frame may be a symbol, slot, or subframe, depending upon the implementation. Configuration (b) of FIG. 12 illustrates the principle that in some embodiments the number of time durations in a reception frame and the number of time durations in a transmission frame may be configured to be equal, in which case if the subcarrier spacing is different the frame length of a reception frame might not equal a frame length of a transmission frame. In some embodiments, the number of time durations in a reception and transmission frame may be predefined, e.g. fixed in a standard.

In the examples in FIG. 12, the difference in subcarrier spacing between the reception frame and transmission frame is always a factor of two, but in general this need not be the case.

Frame Numbering and Timing Offset

Each frame of a frame structure may be assigned a frame number, e.g. to assist with scheduling and/or HARQ retransmission timing and/or physical layer protocol synchronization. The frame number count may restart after a particular number of frames, e.g. the frame number count may run from 0 to 1023, with the frame number returning back to zero every 1024 frames. The frame number of a frame may be indicated in control signaling, e.g. in broadcast signaling.

Figure 13:
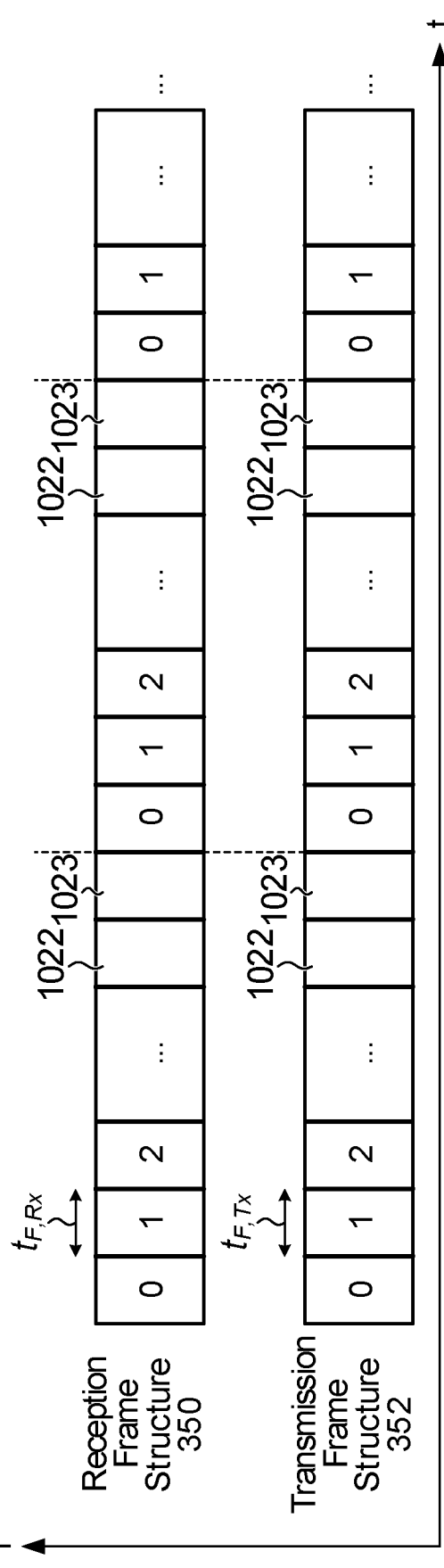
Figure 14:
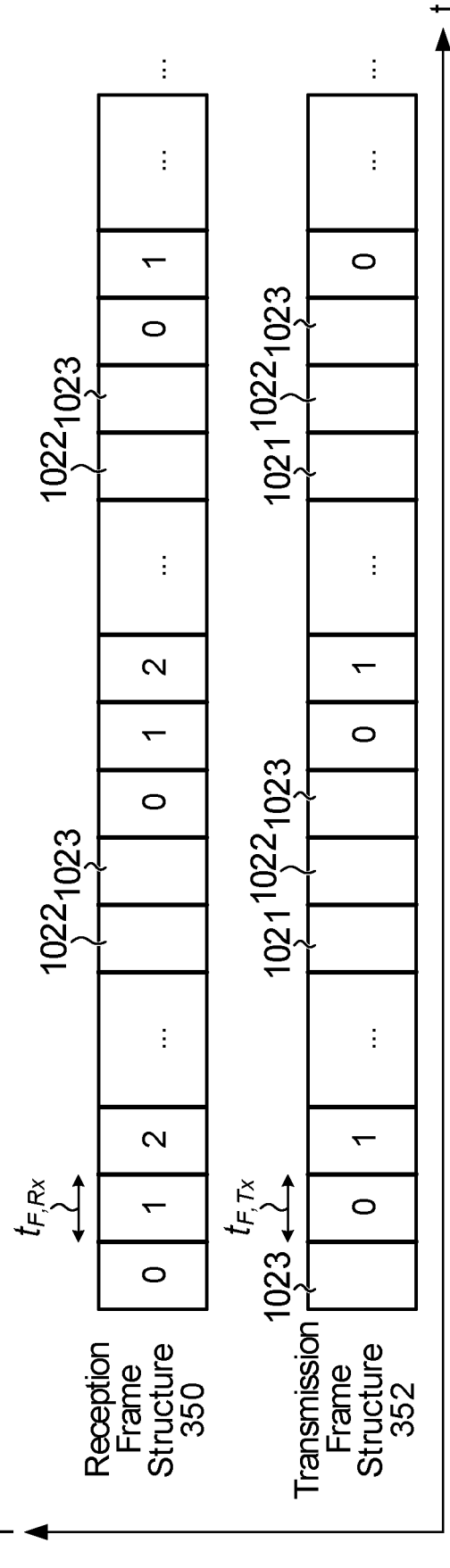

In some embodiments, the frames of the reception frame structure 350 and the frames of the transmission frame structure 352 are each assigned respective frame numbers. The frame number count of the reception frame structure 350 may be separate from the frame number count of the transmission frame structure 352. In some embodiments, the number of frames after which the frame count restarts may be the same for both the reception frame structure 350 and the transmission frame structure 352. That is, the maximum frame number in the reception frame structure 350 and the transmission frame structure 352 may be the same. In some embodiments, the frame numbers of the reception frame structure 350 may be time aligned with the frame numbers of the transmission frame structure 352, possibly with a time offset and/or frame number offset between the frame number of a reception frame and a corresponding frame number of a transmission frame. For example, FIG. 13 illustrates a plurality of frames of the reception frame structure 350 and a plurality of frames of the transmission frame structure 352, according to one embodiment. In the illustrated example, the frame length of a reception frame equals the frame length of a transmission frame (i.e. $t_{F,Rx}=t_{F,Tx}$), the frame count restarts after 1024 frames in both the reception frame structure 350 and the transmission frame structure 352, and the frame number of each reception frame is aligned in time with the frame number of each transmission frame, e.g. when it is frame #1 in the reception frame structure 350 it is also concurrently (in time) frame #1 in the transmission frame structure 352. Any time offset (if present) between the start of a reception frame and the start of the corresponding transmission frame of the same frame number is not illustrated. FIG. 14 illustrates a variation of FIG. 13 in which the frame number of a transmission frame is offset by one frame in time relative to a reception frame. Again, any time offset between the start of a reception frame and a start of a transmission frame is not illustrated. In some embodiments, the frame number of a transmission frame may be offset by N frames in time (forward or backwards in time) relative to the corresponding frame number of the reception frame.

Figure 15:
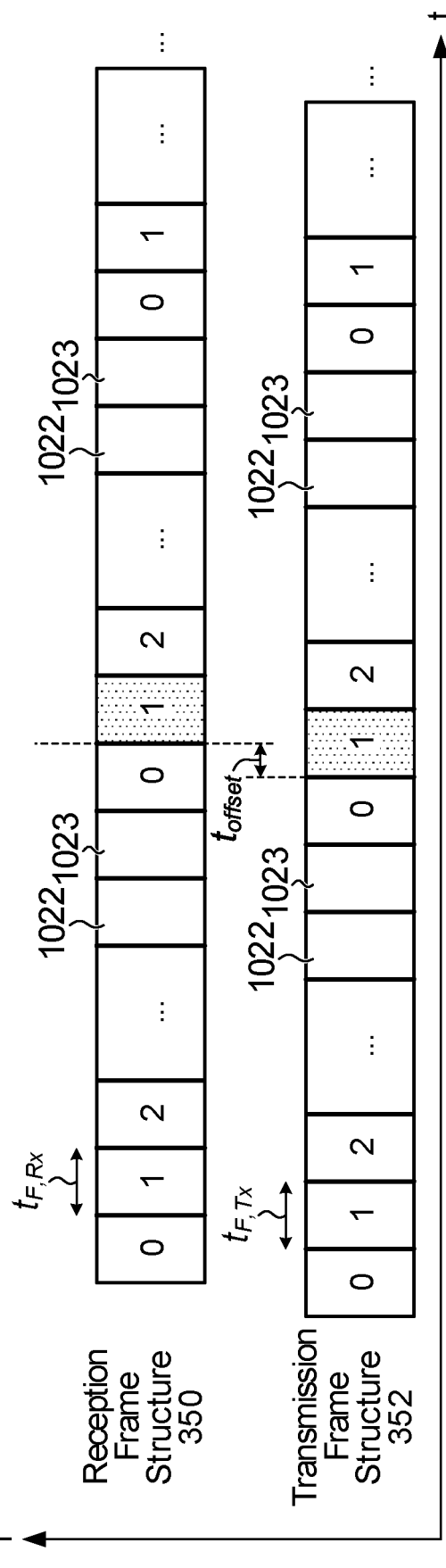
Figure 16:
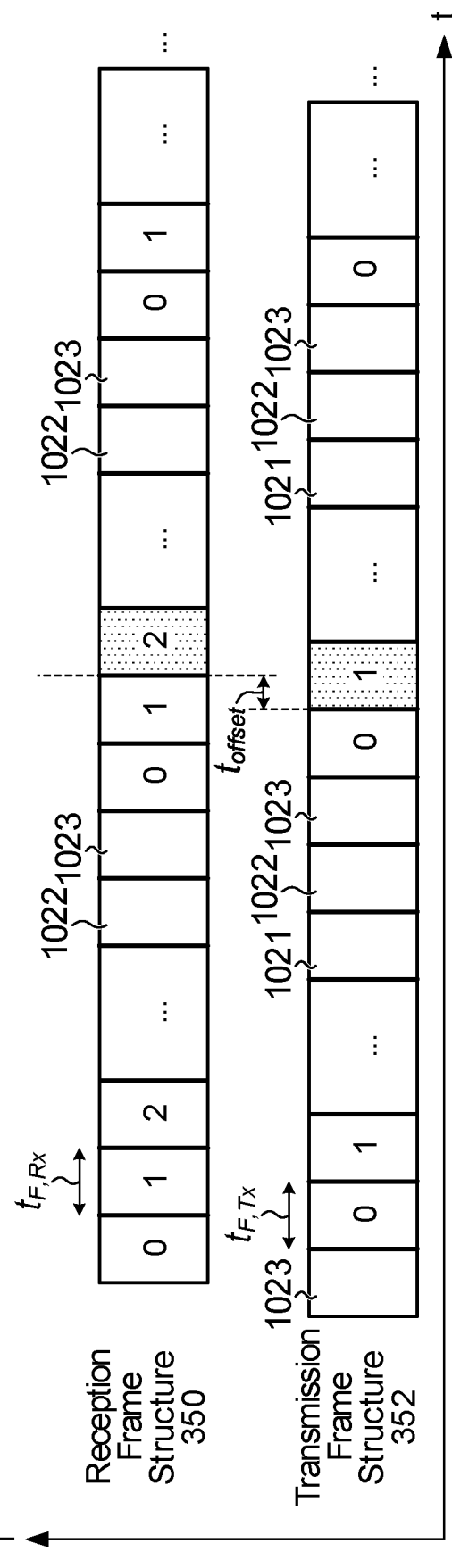

The examples in FIGS. 13 and 14 assume no timing offset (e.g. no timing advance) between a start of a transmission frame and a start of a corresponding reception frame. However, more generally, there may be a timing offset (e.g. timing advance) between the start of a reception frame and the start of a corresponding transmission frame. The timing offset is typically less than one frame in duration. For example, FIG. 15 illustrates a variation of FIG. 13 in which a timing offset $t_{offset}$ exists between the start of a reception frame and the start of a corresponding transmission frame of the same frame number, where $0<t_{offset}<t_F$, and $t_F$ is the frame length of a reception and transmission frame, i.e. $t_F=t_{F,Rx}=t_{F,Tx}$. If the frame number of a transmission frame is offset from the corresponding frame number of the reception frame by a certain number of frames (e.g. like in FIG. 14), then the timing offset value $t_{offset}$ may still be less than one frame, but be between a reception frame number and corresponding offset transmission frame number. For example, FIG. 16 illustrates a variation of FIG. 14 in which a timing offset $t_{offset}$ exists between the start of a reception frame and the start of a corresponding transmission frame, where the corresponding transmission frame has a frame number that is offset from the reception frame.

Figure 17:
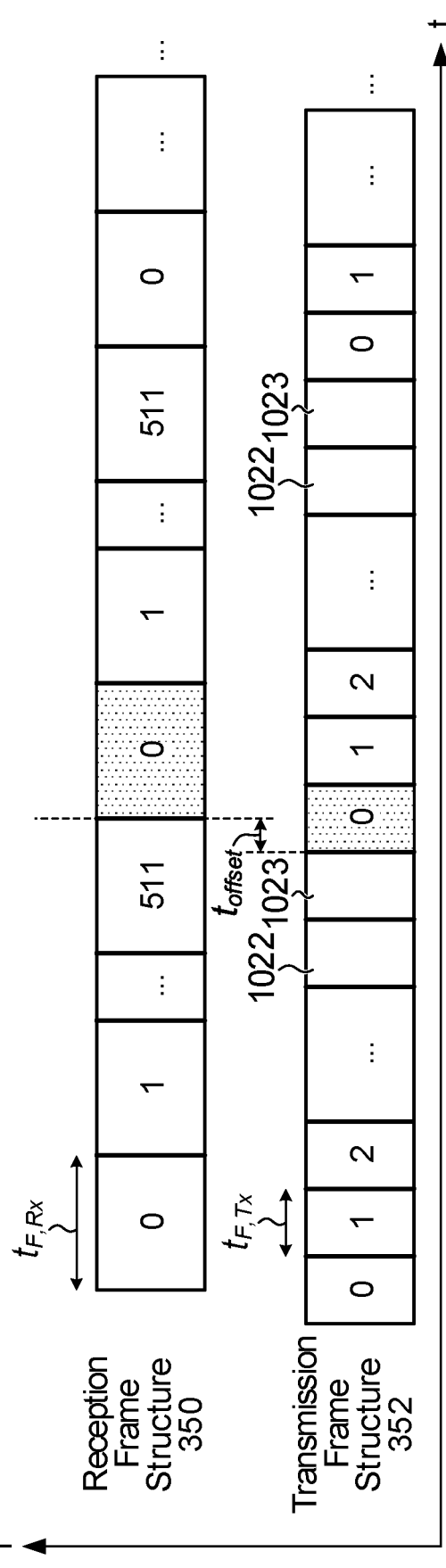

In some embodiments, the timing offset $t_{offset}$ may be measured as the offset, in time, between the first frame number of a reception frame and the corresponding first frame number of a transmission frame. Measuring the time offset in relation to the first frame number may be applicable in configurations in which the reception frame duration is not equal to the transmission frame duration (i.e. $t_{F,Rx}\neq t_{F,Tx}$), e.g. because of a different subcarrier spacing used in the reception frame structure 350 compared to the transmission frame structure 352. For example, FIG. 17 illustrates a plurality of frames of the reception frame structure 350 and a plurality of frames of the transmission frame structure 352, according to another embodiment. In the illustrated example, the subcarrier spacing of the symbols transmitted/received in the reception frame structure 350 is half the subcarrier spacing of the symbols transmitted/received in the transmission frame structure 352, and $t_{F,Rx}=2\times t_{F,Tx}$. The frame count restarts after every 512 frames in the reception frame structure 350, and the frame count restarts after every 1024 frames in the transmission frame structure 352. The timing offset $t_{offset}$ is measured in relation to frame number 0 of the reception and transmission frame structures 350/352. Even though the subcarrier spacing is different in the reception frame structure 350 as compared to the transmission frame structure 352, the starting frame number 0 of both the reception frame structure 350 and the transmission frame structure 352 is time aligned having timing offset $t_{offset}$. Because the reception frame structure 350 has a different maximum frame number compared to the transmission frame structure 352, the starting frame number 0 of both the reception frame structure 350 and the transmission frame structure 352 are time aligned with timing offset $t_{offset}$. More generally, in FIG. 17, the start of frame number N of a reception frame has a timing offset $t_{offset}$ from the start of frame number 2N of a transmission frame because the subcarrier spacing of the transmission frame is twice the subcarrier spacing of the reception frame.

In some embodiments, signaling is received by the UE that indicates the frame number of a reception frame, and the UE then determines the frame number for the transmission frame based on a predefined relationship between a frame number of the reception frame and a corresponding frame number of a transmission frame, e.g. based on a known offset between a reception frame number and a corresponding transmission frame number. In other embodiments the opposite occurs: signaling indicates the frame number of a transmission frame, and the frame number for the reception frame is determined based on a predefined relationship between a frame number of the transmission frame and a corresponding frame number of a reception frame.

In some embodiments, the frame number of a reception frame and the frame number of a transmission frame are both signaled to the UE. In some embodiments, a reception frame number N may be signaled in a master information block (MIB) or in UE-specific RRC signaling, and a transmission frame number may be signaled by signaling a frame number offset value. The frame number offset value may be signaled in a MIB or in UE-specific RRC signaling. Then, for the transmission frame with a starting time offset $t_{offset}$ from reception frame N, the frame number of that transmission frame is N plus or minus the signaled frame number offset value. For example, in the examples in FIGS. 14 and 16, the frame number offset value is one because the frame number of a transmission frame is offset by one compared to the corresponding frame number of the reception frame. In some embodiments, the frame number offset value may be predefined, e.g. fixed and known in advance by the UE.

In some embodiments, the frame timing of the transmission frame structure 352, e.g. the time at which a transmission frame starts, can be determined from the corresponding reception frame number and/or reception frame start time. For example, a timing offset value $t_{offset}$ may be signaled to the UE, which the UE may use to determine the start time of a frame in the transmission frame structure 352. As one example, the UE may receive signaling indicating reception frame N and indicating a timing offset value $t_{offset}$, and the UE may then determine that transmission frame N is to begin at a point in time that is offset $t_{offset}$ in advance of the start time of reception frame N, e.g. like in FIG. 15. The same sample duration may be assumed for the reception and transmission frame structures 350/352, as is the case in FIG. 15. The sample duration is the minimum time unit to construct a frame.

In the embodiments above in which a timing offset value $t_{offset}$ is described, the timing offset value may be UE-specific and signaled separately for each UE. In some embodiments, the timing offset value $t_{offset}$ may be a timing advance value $t_{TA}$. In some embodiments, the timing advance value may be computed using the equation $t_{TA}=(N_{TA}+N_{TA,offset})T_c$, where $N_{TA,offset}$ is the value between a reception frame boundary and a transmission frame boundary, which may be fixed in a standard specification, or may be indicated by signaling from one communication side, e.g. from the base station. $N_{TA}$ is a time advance value, which in some embodiments may come from a random access channel (RACH) response or a timing advance (TA) command (e.g. in a MAC header). $T_c$ is the sampling period.

In some embodiments, the frame number may be used to configure particular parameters of a reception frame and/or transmission frame on a frame-specific basis. For example, the UE may receive signaling that indicates that reception frame 0 is to have communication direction pattern RRFFF and reception frame 1 is to have communication direction pattern RFFFF, etc.

Additional Embodiments and Methods

Although two separate frame structures are primarily described in the embodiments above, i.e. a reception frame structure and a transmission frame structure, in other embodiments there may instead be a single frame structure that includes time durations dedicated only for reception "R", time durations that are flexible "F", and possible time durations dedicated only for transmission "T". However, by having two separate frame structures, legacy UEs configured to perform FDD communication may be better accommodated because the UE can receive (downlink) on the reception frame structure and transmit (uplink) on the transmission frame structure. A separate reception frame structure and transmission frame structure may also assist in implementations in which transmissions between a base station and UEs may occur on different carrier frequencies, because the reception frame structure may be defined and used for one carrier frequency and the transmission frame structure may be defined and used for another carrier frequency.

The description above discusses the frame structure(s) primarily in the context of communications between UEs and base stations, i.e. downlink and uplink. However, the embodiments described above also apply to other scenarios, e.g. sidelink communications (i.e. D2D communications) between two UEs, as well as IAB communications. For example, for a sidelink communication, the "reception" in "reception frame structure" and the "transmission" in "transmission frame structure" may be from the perspective of a slave UE or target UE communicating with a master UE.

Figure 18:
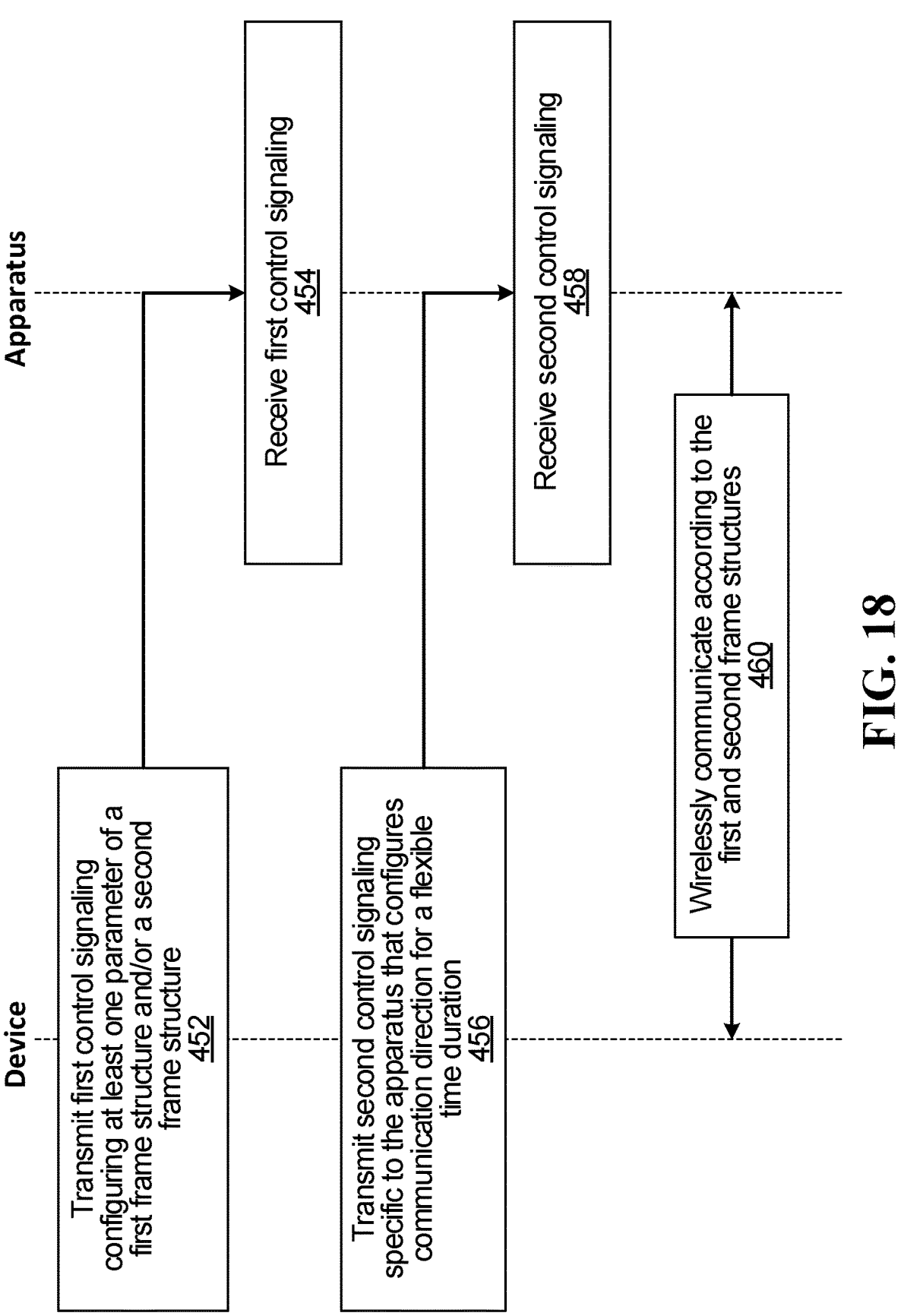
FIGS. 18 to 20 illustrate methods performed by a device and apparatus, according to various embodiments.

FIG. 18 is a method performed by a device and an apparatus, according to one embodiment. The device may be a network device, e.g. base station 170. However, the device may instead be a user equipment. The apparatus may be a user equipment, e.g. UE 110.

At step 452, the device transmits first control signaling that is common to a plurality of apparatuses. For example, the first control signaling may be cell common signaling (i.e. broadcast signaling) and/or multicast signaling. The first control signaling includes an indication that configures one or more parameters of a first frame structure and/or one or more parameters of a second frame structure. The first frame structure is different from the second frame structure. For example, the first frame structure may be a reception frame structure and the second frame structure may be a transmission frame structure.

In some embodiments, the first frame structure includes a first frame, and the first control signaling indicates at least one of: frame length of the first fame; subcarrier spacing of symbols communicated in the first frame; number of time durations within the first frame for which a respective communication direction is configured; length of one or more of the time durations within the first frame for which the respective communication direction is configured; and/or the respective communication direction configured for each of the one or more time durations.

At step 454, the apparatus receives the first control signaling.

At step 456, the device transmits second control signaling. The second control signaling is specific to the apparatus. The second control signaling includes an indication that indicates, for a particular time duration for which the communication direction is configured as a flexible duration, whether the apparatus is to wirelessly transmit to the device and/or wirelessly receive from the device during the flexible duration.

At step 458, the apparatus receives the second control signaling.

At step 460, the device and the apparatus wirelessly communicate according to the first frame structure and according to the second frame structure. The wireless communications according to the first frame structure and according to the second frame structure are concurrent in time.

In some embodiments, the first frame structure includes a first frame, the second frame structure includes a second frame, and the first frame, but not the second frame, includes a reception duration. The reception duration may be defined as a time duration in which wireless transmission to the device is prohibited on the first frame and in which the apparatus is to receive a wireless communication from the device on the first frame.

Figure 19:
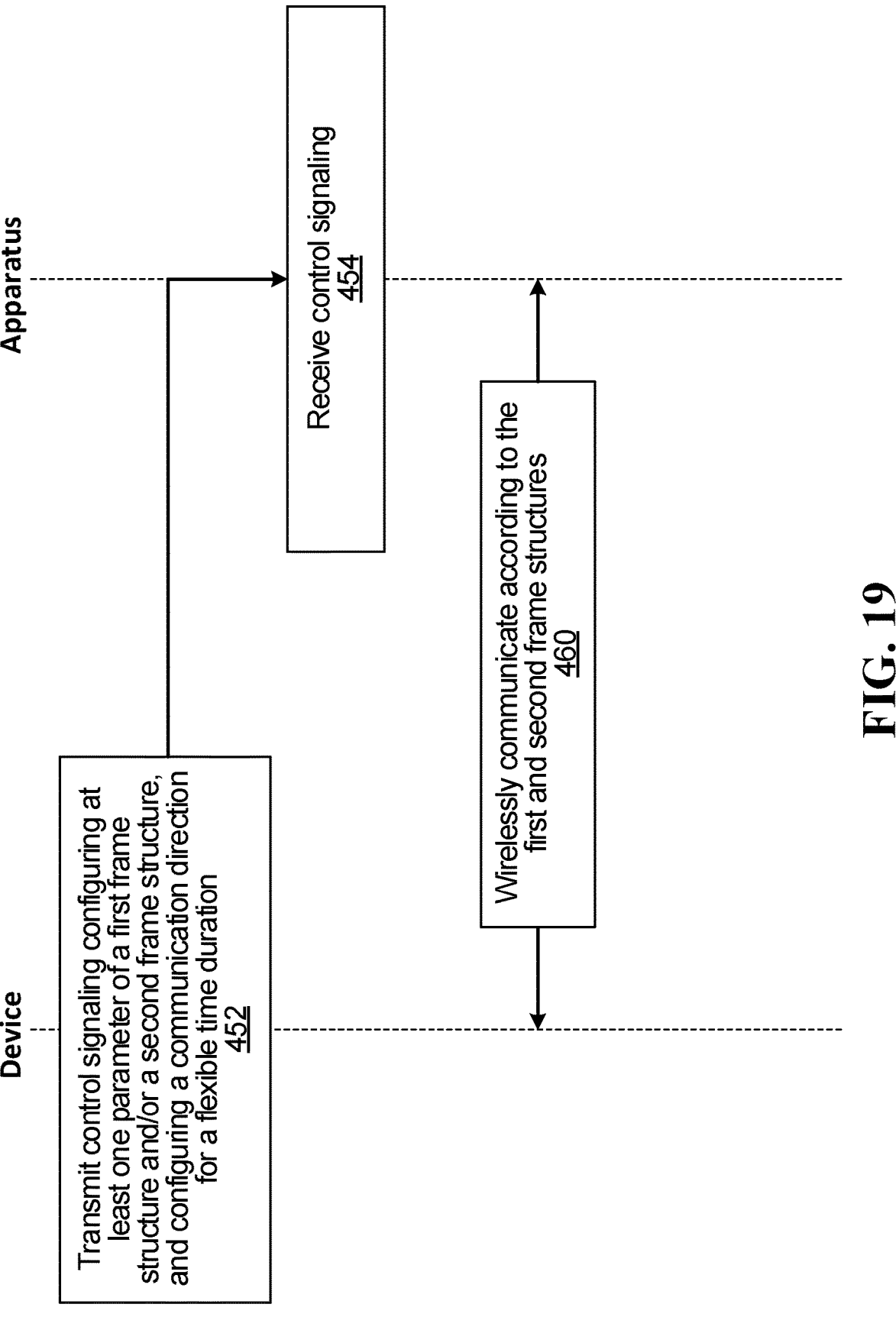

FIG. 19 illustrates a variation of FIG. 18 in which the first control signaling and the second control signaling are a same control signaling. Different fields (e.g. different information elements) in the same control signaling may indicate different parameters. The control signaling may be common to a plurality of apparatuses (e.g. broadcast signaling) or apparatus-specific.

Figure 20:
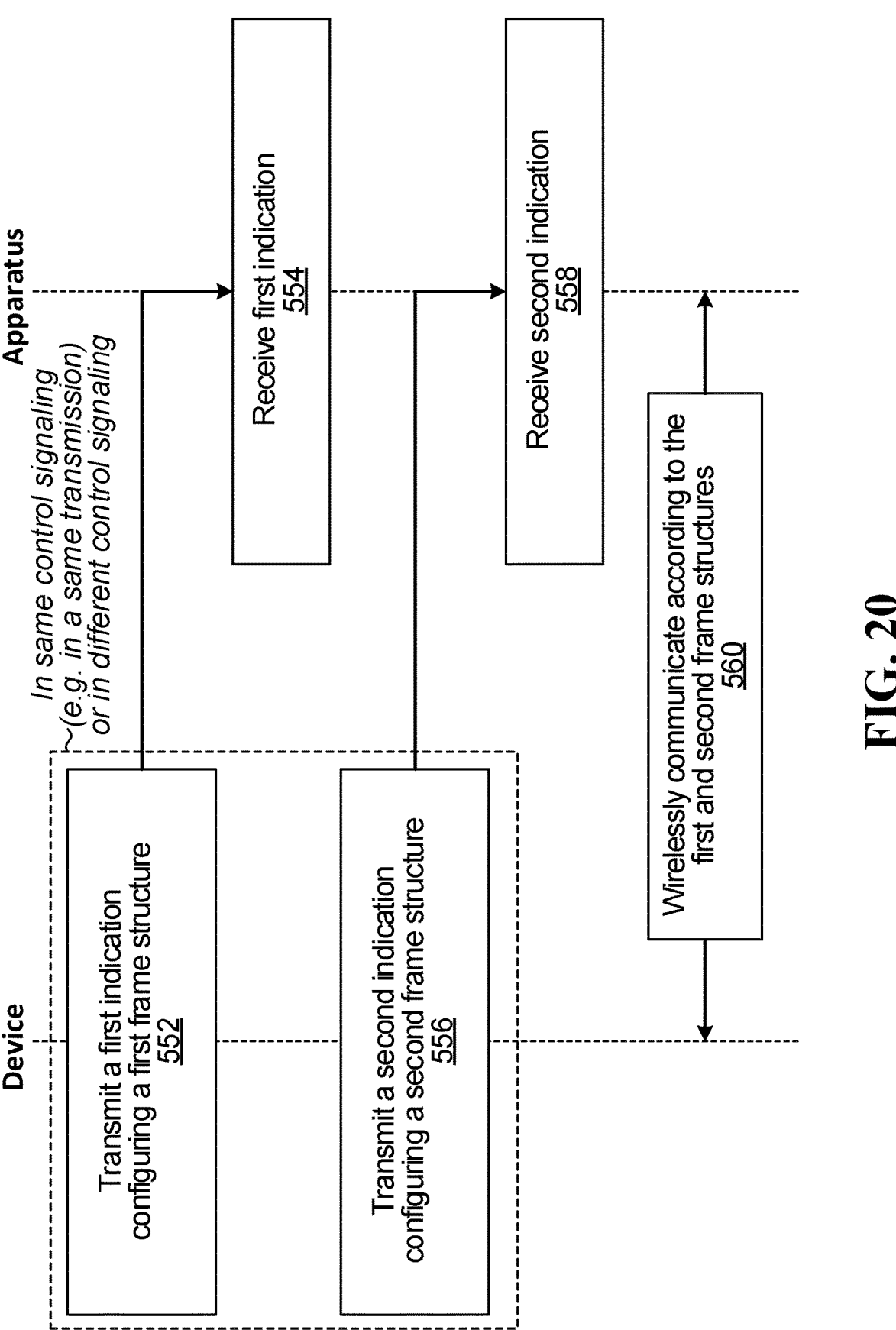

FIG. 20 is a method performed by a device and an apparatus, according to another embodiment. The device may be a network device, e.g. base station 170. However, the device may instead be a user equipment. The apparatus may be a user equipment, e.g. UE 110.

At step 552, the device transmits a first indication that configures a first frame structure. A first frame in the first frame structure includes a time duration that is configured for receiving a first wireless transmission from the device (e.g. reception duration "R"). At step 554, the apparatus receives the first indication. In some embodiments, the first indication is transmitted to a plurality of apparatuses, not just the apparatus illustrated in FIG. 20.

At step 556, the device transmits a second indication that configures a second frame structure. A second frame in the second frame structure includes a time duration that is configured for transmitting a second wireless transmission to the device (e.g. a transmission duration "T"). At step 558, the apparatus receives the second indication. In some embodiments, the second indication is transmitted to a plurality of apparatuses, not just the apparatus illustrated in FIG. 20.

Note that the first indication and the second indication may be sent in two separate transmissions or in a same transmission. In some embodiments, the first indication and the second indication are sent in same control signaling, e.g. the first indication and the second indication may be different fields (e.g. different information elements) in same control information. In other embodiments, the first indication may be sent in first control signaling, and the second indication may be sent in different second control signaling.

An indication (e.g. the first indication or the second indication of FIG. 20) configures a frame structure by indicating one or more parameters of that frame structure. For example, if the first indication indicates that the first frame has a particular length, then the device and the apparatus transmit over a frame of that length. As another example, if the first indication indicates a particular location (in time) of the time duration that is configured for receiving the first wireless transmission from the device, then the first wireless transmission is received by the apparatus at that particular location in time.

In some embodiments, the time duration in the first frame that is configured for receiving the first wireless transmission from the device is a reception duration "R". The reception duration "R" may be a time duration in which transmission to the device is prohibited in the first frame. In some embodiments, no transmission is sent to the device or received by the apparatus on the second frame structure during the reception duration.

In some embodiments, the first frame includes a flexible duration "F" in addition to and non-overlapping with the reception duration. The apparatus may be configured to perform one of the following during the flexible duration: receive from the device, or transmit to the device, or perform FD communication in order to concurrently transmit to the device and receive from the device. In some embodiments, the flexible duration is a duration in time in which a direction of communication is configurable on an apparatus-specific basis. In some embodiments, the second frame also includes a flexible duration. The flexible duration of the first frame may partially overlap with the flexible duration of the second frame.

In some embodiments, the time duration in the second frame that is configured for transmitting the second wireless transmission to the device is a transmission duration "T". The transmission duration "T" may be a time duration in which transmission from the device is prohibited in the second frame.

In some embodiments, wirelessly communicating with the device occurs on a same serving cell. The first frame structure and the second frame structure may both be configured for that same serving cell.

In some embodiments, the first frame structure is associated with a first carrier frequency and the second frame structure is associated with a second carrier frequency. The first carrier frequency may be the same as or different from the second carrier frequency. In some embodiments, the first frame and the second frame may partially or fully overlap in a frequency domain (e.g. like in FIG. 10 configuration (a)).

In some embodiments, the first frame is on a first frequency band and the second frame is on a second frequency band; and/or the first frame is on a first frequency carrier and the second frame is on a second frequency carrier; and/or the first frame is for wireless communication on a first serving cell and the second frame is for wireless communication on a second serving cell; and/or the first frame is on a first BWP and the second frame is on a second BWP. The first frequency carrier may be the same as or different from the second frequency carrier. The first frequency band may be the same as or different from the second frequency band. The first serving cell may be the same as or different from the second serving cell. The first BWP may be the same as or different from the second BWP.

In some embodiments, the first indication is received by the apparatus on first control signaling and the second indication is received on different second control signaling. The first control signaling and/or the second control signaling may common to a plurality of apparatuses or apparatus-specific.

In some embodiments, the first indication and the second indication may both be received in same control signaling. In some such embodiments, the first indication and the second indication may be in different information elements in the same control signaling. The same control signaling may common to a plurality of apparatuses or apparatus-specific.

In some embodiments, the first indication indicates at least one of the following parameters of the first frame structure: frame length of the first fame; subcarrier spacing of symbols communicated in the first frame; number of time durations within the first frame for which a respective communication direction is configured; length of one or more of the time durations within the first frame for which the respective communication direction is configured; the respective communication direction configured for each of the one or more time durations. In some embodiments, the second indication indicates at least one of the following parameters of the second frame structure: frame length of the second fame; subcarrier spacing of symbols communicated in the second frame; number of time durations within the second frame for which a respective communication direction is configured; length of one or more of the time durations within the second frame for which the respective communication direction is configured; the respective communication direction configured for each of the one or more time durations.

In some embodiments, the method may include the apparatus receiving first control signaling that is common to a plurality of apparatuses. The first control signaling may indicate at least one of: frame length of the first fame; subcarrier spacing of symbols communicated in the first frame; number of time durations within the first frame for which a respective communication direction is configured; length of one or more of the time durations within the first frame for which the respective communication direction is configured; the respective communication direction configured for each of the one or more time durations. In some embodiments, the method may include the apparatus receiving second control signaling that is specific to the apparatus. The second control signaling may indicate, for a particular time duration for which the communication direction is configured as a flexible duration, whether the apparatus is to wirelessly transmit to the device and/or wirelessly receive from the device during the flexible duration. The first indication may be in the first control signaling or the second control signaling.

In some embodiments, control signaling is in RRC and/or DCI.

In some embodiments, the first frame is used for communicating first symbols having a first subcarrier spacing, and the second frame is used for communicating second symbols having a second subcarrier spacing. In some embodiments, a start of the second frame is offset in time from the start of the first frame. In some embodiments, a frame number of the first frame is the same as the frame number of the second frame. In some embodiments, a frame number of the first frame is different from the frame number of the second frame. In some embodiments, a maximum frame number in the first frame structure is different from the maximum frame number in the second frame structure.

In another embodiment, a method is provided that is performed by an apparatus, e.g. by a UE. The method may include wirelessly communicating with a device in a first frame of a first frame structure. The device may be a network device, such as a base station. Alternatively, the device may be another UE. The method may further include concurrently wirelessly communicating with the device in a second frame of a second frame structure. For example, the first frame structure may be the reception frame structure 350 and the second frame structure may be the transmission frame structure 352.

In some embodiments, the first frame, but not the second frame, includes a reception duration. The reception duration is a time duration in which wireless transmission to the device is prohibited on the first frame and in which the apparatus is to receive a wireless communication from the device on the first frame. An example is reception duration "R" in FIG. 9. In some embodiments, the second frame, but not the first frame, includes a transmission duration. The transmission duration is a time duration in which wireless transmission from the device is prohibited on the second frame and in which the apparatus is to wirelessly transmit to the device on the second frame. An example is transmission duration "T" in FIG. 9.

In some embodiments, the first frame includes a flexible duration in addition to and non-overlapping with the reception duration. The flexible duration is a duration in time in which a direction of communication is configurable on an apparatus-specific basis, and the apparatus is configured to transmit a first wireless transmission to the device and/or receive a second wireless transmission from the device during the flexible duration. An example is flexible duration "F" in a reception frame in FIG. 9. In some embodiments, the apparatus performs FD communication in the flexible duration in order to concurrently transmit the first wireless transmission to the device and receive the second wireless transmission from the device, and the apparatus does not perform FD communication in the reception duration, but instead is configured only for wirelessly receiving on the first frame structure during the reception duration. In some embodiments, the flexible duration is a first flexible duration, and the second frame includes a second flexible duration that at least partially overlaps in time with the first flexible duration.

In some embodiments, the first frame and the second frame at least partially overlap in the frequency domain. In some of such embodiments, no transmission is sent or received by the apparatus in the second frame during the reception duration of the first frame. For example, during the reception duration in the first frame, the same duration in the second frame may be configured as reserved "X".

In some embodiments, the first frame is on a first frequency band and the second frame is on a different second frequency band; and/or the first frame is on a first frequency carrier and the second frame is on a different second frequency carrier; and/or the first frame is for wireless communication on a first serving cell and the second frame is for wireless communication on a different second serving cell; and/or the first frame is on a first bandwidth part (BWP) and the second frame is on a different second BWP.

In some embodiments, control signaling may be received that configures at least one parameter of the first frame structure and/or the second frame structure. In some embodiments, receiving the control signaling may include receiving first control signaling that is common to a plurality of apparatuses, the first control signaling indicating at least one of: frame length of the first fame; subcarrier spacing of symbols communicated in the first frame; number of time durations within the first frame for which a respective communication direction is configured; length of one or more of the time durations within the first frame for which the respective communication direction is configured; the respective communication direction configured for each of the one or more time durations. In some embodiments, receiving the control signaling may additionally or alternatively include receiving second control signaling that is specific to the apparatus, the second control signaling indicating, for a particular time duration for which the communication direction is configured as a flexible duration, whether the apparatus is to wirelessly transmit to the device and/or wirelessly receive from the device during the flexible duration. In some embodiments, the second control signaling may be present in RRC signaling and/or in DCI.

In some embodiments, the first frame may be used for communicating first symbols having a first subcarrier spacing, and the second frame may be used for communicating second symbols having a different second subcarrier spacing. Examples are illustrated in FIG. 12. In some embodiments, the first frame and the second frame have different frame lengths (like in configuration (b) of FIG. 12).

In some embodiments, the start of the second frame is offset in time from the start of the first frame. In some embodiments, a frame number of the first frame is the same as the frame number of the second frame. In other embodiments, a frame number of the first frame is different from the frame number of the second frame. In some embodiments, a maximum frame number in the first frame structure is different from the maximum frame number in the second frame structure.

In some embodiments, the apparatus is a UE, the device is a network device, and in the reception duration: (i) uplink transmission is prohibited on the first frame structure, and (ii) the apparatus is to receive a downlink transmission on the first frame structure. In other embodiments, the apparatus is a first user equipment and the device is a second user equipment.

An apparatus is also provided that is configured to perform the methods.

In another embodiment, a method is performed by a device, e.g. a network device such as a base station, or a user equipment. The method may include wirelessly communicating with a first group of apparatuses in a first frame of a first frame structure. The method may further include concurrently wirelessly communicating with a second group of apparatuses in a second frame of a second frame structure. The first frame structure may be a reception frame structure, and the second frame structure may be a transmission frame structure. An example is illustrated in FIG. 9 in which the first group of apparatuses and the second group of apparatuses are a same single group of apparatuses consisting of UEs 110A, 110B, and 110C. However, the first and second group of apparatuses may be mutually exclusive or only partially overlap.

In some embodiments, the first frame, but not the second frame, includes a reception duration. The reception duration is a time duration in which wireless transmission from the first group of apparatuses to the device is prohibited on the first frame and in which the device is to transmit a wireless communication to the first group of apparatuses on the first frame. An example is reception duration "R" in FIG. 9.

In some embodiments, the second frame, but not the first frame, includes a transmission duration. The transmission duration is a time duration in which wireless transmission from the device to the second group of apparatuses is prohibited on the second frame and in which the device is to receive a wireless transmission from at least one apparatus of the second group of apparatuses on the second frame. An example is transmission duration "T" in FIG. 9.

In some embodiments, the first frame includes a flexible duration in addition to and non-overlapping with the reception duration. The flexible duration is a duration in time in which a direction of communication is configurable on an apparatus-specific basis for each apparatus of the first group of apparatuses. An example is flexible duration "F" in a reception frame of FIG. 9. In some embodiments, during the flexible duration on the first frame structure the device: receives a transmission from a first apparatus in the first group of apparatuses and does not transmit to the first apparatus; and/or transmits to a second apparatus in the first group of apparatuses and does not receive a transmission from the second apparatus; and/or concurrently transmits to/receives a transmission from a third apparatus in the first group of apparatuses (the third apparatus may be UE 110A). In some embodiments, the first apparatus operates in FDD communication mode or TDD communication mode, the second apparatus also operates in FDD or TDD mode, and the third apparatus operates in FD communication mode.

In some embodiments, the first group of apparatuses and the second group of apparatuses include apparatuses that operate in TDD communication mode and/or FDD communication mode and/or FD communication mode. For example, in FIG. 9 the UE 110A operates in FD mode, UE 110B operates in TDD mode, and UE 110C operates in FDD mode.

In some embodiments, the first frame and the second frame at least partially overlap in the frequency domain, and no transmission is sent or received by the device in the second frame during the reception duration of the first frame. For example, the time duration in the second frame may be indicated as reserved "X".

In some embodiments, the first frame is on a first frequency band and the second frame is on a different second frequency band; and/or the first frame is on a first frequency carrier and the second frame is on a different second frequency carrier; and/or the first frame is for wireless communication on a first serving cell and the second frame is for wireless communication on a different second serving cell; and/or the first frame is on a first bandwidth part (BWP) and the second frame is on a different second BWP.

In some embodiments, the method further includes transmitting control signaling configuring at least one parameter of the first frame structure and/or the second frame structure. In some embodiments, transmitting the control signaling may include transmitting first control signaling that is common to the first group of apparatuses, the first control signaling indicating at least one of: frame length of the first fame; subcarrier spacing of symbols communicated in the first frame; number of time durations within the first frame for which a respective communication direction is configured; length of one or more of the time durations within the first frame for which the respective communication direction is configured; the respective communication direction configured for each of the one or more time durations. In some embodiments, transmitting the control signaling may additionally or instead include transmitting apparatus-specific control signaling to each apparatus in the first group of apparatuses, the apparatus-specific control signaling indicating, for a particular time duration for which the communication direction is configured as a flexible duration, whether the apparatus is to wirelessly transmit to the device and/or wirelessly receive from the device during the flexible duration. In some embodiments, the apparatus-specific control signaling may be transmitted in RRC signaling and/or in DCI.

In some embodiments, the first frame is used for communicating first symbols having a first subcarrier spacing, and the second frame is used for communicating second symbols having a different second subcarrier spacing, e.g. like in FIG. 12. In some embodiments, the first frame and the second frame have different frame lengths, e.g. like in configuration (b) of FIG. 12.

In some embodiments, a start of the second frame is offset in time from the start of the first frame. In some embodiments, a frame number of the first frame is the same as the frame number of the second frame. In other embodiments, a frame number of the first frame is different from the frame number of the second frame. In some embodiment, a maximum frame number in the first frame structure is different from the maximum frame number in the second frame structure.

In some embodiments, the device is a network device, each apparatus in the first group of apparatuses and in the second group of apparatuses is a user equipment, and in the reception duration: (i) uplink transmission is prohibited on the first frame structure, and (ii) the device is to transmit a downlink transmission on the first frame structure. In other embodiments, the device is a user equipment. Each apparatus in the first group of apparatuses and in the second group of apparatuses may also be a user equipment.

A device is also provided that is configured to perform the methods.

In view of the above, in some embodiments a unified frame structure is disclosed that can be used to accommodate both UEs that have FD communication capability and other UEs (e.g. legacy UEs) that do not have FD communication capability. The unified frame structure may be used for uplink/downlink communication between UEs and base stations and/or D2D communication and/or IAB communications.

In view of, and in addition to the above, the following examples are disclosed.

Example 1: A method performed by an apparatus, the method comprising: receiving a first indication that configures a first frame structure, wherein a first frame in the first frame structure includes a time duration that is configured for receiving a first wireless transmission from a device; receiving a second indication that configures a second frame structure, wherein a second frame in the second frame structure includes a time duration that is configured for transmitting a second wireless transmission to the device; wirelessly communicating with the device according to the first frame structure and the second frame structure.

Example 2: The method of example 1, wherein the time duration in the first frame that is configured for receiving the first wireless transmission is a reception duration, wherein the reception duration is a time duration in which transmission to the device is prohibited in the first frame.

Example 3: The method of example 2, wherein no transmission is sent to the device or received by the apparatus on the second frame structure during the reception duration.

Example 4: The method of example 2 or example 3, wherein the first frame includes a flexible duration in addition to and non-overlapping with the reception duration, and wherein the apparatus is configured to perform one of the following during the flexible duration: receive from the device, or transmit to the device, or perform full duplex (FD) communication in order to concurrently transmit to the device and receive from the device.

Example 5: The method of example 4, wherein the flexible duration is a duration in time in which a direction of communication is configurable on an apparatus-specific basis.

Example 6: The method of example 4 or example 5, wherein the flexible duration is a first flexible duration, and wherein the second frame includes a second flexible duration that at least partially overlaps in time with the first flexible duration.

Example 7: The method of any one of examples 1 to 6, wherein the time duration in the second frame that is configured for transmitting the second wireless transmission is a transmission duration, wherein the transmission duration is a time duration in which transmission from the device is prohibited in the second frame.

Example 8: The method of any one of examples 1 to 7, wherein the wirelessly communicating with the device occurs on a same serving cell, and wherein the first frame structure and the second frame structure are both configured for the same serving cell.

Example 9: The method of any one of examples 1 to 8, wherein the first frame structure is associated with a first carrier frequency and the second frame structure is associated with a second carrier frequency.

Example 10: The method of example 9, wherein the first carrier frequency is different from the second carrier frequency.

Example 11: The method of any one of examples 1 to 9, wherein the first frame and the second frame at least partially overlap in a frequency domain.

Example 12: The method of any one of examples 1 to 7, wherein: the first frame is on a first frequency band and the second frame is on a second frequency band; and/or the first frame is on a first frequency carrier and the second frame is on a second frequency carrier; and/or the first frame is for wireless communication on a first serving cell and the second frame is for wireless communication on a second serving cell; and/or the first frame is on a first bandwidth part (BWP) and the second frame is on a second BWP.

Example 13: The method of any one of examples 1 to 12, wherein the first indication is received on first control signaling and the second indication is received on second control signaling.

Example 14: The method of example 13, wherein the first control signaling and/or the second control signaling is common to a plurality of apparatuses.

Example 15: The method of any one of examples 1 to 12, wherein the first indication and the second indication are both received in same control signaling.

Example 16: The method of example 15, wherein the first indication and the second indication are in different information elements in the same control signaling.

Example 17: The method of example 15 or example 16, wherein the same control signaling is common to a plurality of apparatuses.

Example 18: The method of any one of examples 1 to 17, wherein the first indication indicates at least one of the following parameters of the first frame structure: frame length of the first fame; subcarrier spacing of symbols communicated in the first frame; number of time durations within the first frame for which a respective communication direction is configured; length of one or more of the time durations within the first frame for which the respective communication direction is configured; the respective communication direction configured for each of the one or more time durations.

Example 19: The method of any one of examples 1 to 18, wherein the second indication indicates at least one of the following parameters of the second frame structure: frame length of the second fame; subcarrier spacing of symbols communicated in the second frame; number of time durations within the second frame for which a respective communication direction is configured; length of one or more of the time durations within the second frame for which the respective communication direction is configured; the respective communication direction configured for each of the one or more time durations.

Example 20: The method of any one of examples 1 to 12, comprising receiving first control signaling that is common to a plurality of apparatuses, the first control signaling indicating at least one of: frame length of the first fame; subcarrier spacing of symbols communicated in the first frame; number of time durations within the first frame for which a respective communication direction is configured; length of one or more of the time durations within the first frame for which the respective communication direction is configured; the respective communication direction configured for each of the one or more time durations.

Example 21: The method of example 20, comprising receiving second control signaling that is specific to the apparatus, the second control signaling indicating, for a particular time duration for which the communication direction is configured as a flexible duration, whether the apparatus is to wirelessly transmit to the device and/or wirelessly receive from the device during the flexible duration.

Example 22: The method of example 21, wherein the first indication is in the first control signaling or the second control signaling.

Example 23: The method of example 13 or 14 or 20 or 21 or 22, wherein the first control signaling is present in radio resource control (RRC) signaling and/or downlink control information (DCI).

Example 24: The method of example 13 or 14 or 21 or 22, wherein the second control signaling is present in radio resource control (RRC) signaling and/or downlink control information (DCI).

Example 25: The method of any one of examples 1 to 24, wherein the first frame is used for communicating first symbols having a first subcarrier spacing, and wherein the second frame is used for communicating second symbols having a second subcarrier spacing.

Example 26: The method of any one of examples 1 to 25, wherein a start of the second frame is offset in time from the start of the first frame.

Example 27: The method of any one of examples 1 to 26, wherein a frame number of the first frame is the same as the frame number of the second frame.

Example 28: The method of any one of examples 1 to 26, wherein a frame number of the first frame is different from the frame number of the second frame.

Example 29: The method of any one of examples 1 to 28, wherein a maximum frame number in the first frame structure is different from the maximum frame number in the second frame structure.

Example 30: The method of any one of examples 1 to 29, wherein the apparatus is a user equipment, wherein the device is a network device, and wherein during the time duration in the first frame that is configured for receiving the first wireless transmission: (i) uplink transmission is prohibited on the first frame, and (ii) the apparatus is to receive a downlink transmission on the first frame.

Example 31: The method of any one of examples 1 to 29, wherein the apparatus is a first user equipment and the device is a second user equipment.

Example 32: An apparatus configured to perform the method of any one of examples 1 to 31.

Example 33: An apparatus comprising a processor and a memory; the memory including processor-executable instruction that, when executed by the processor, cause the processor to control the apparatus to perform the method of any one of examples 1 to 31.

Example 34: An apparatus comprising: a receiver to: receive a first indication that configures a first frame structure, wherein a first frame in the first frame structure includes a time duration that is configured for receiving a first wireless transmission from a device; receive a second indication that configures a second frame structure, wherein a second frame in the second frame structure includes a time duration that is configured for transmitting a second wireless transmission to the device; the receiver and a transmitter to wirelessly communicate with the device according to the first frame structure and the second frame structure.

Example 35: A method performed by a device, the method comprising: transmitting a first indication that configures a first frame structure, wherein a first frame in the first frame structure includes a time duration that is configured for sending a first wireless transmission from the device to at least one apparatus of a plurality of apparatuses; transmitting a second indication that configures a second frame structure, wherein a second frame in the second frame structure includes a time duration that is configured for receiving a second wireless transmission from one or more of the plurality of apparatuses; wirelessly communicating with the plurality of apparatuses according to the first frame structure and the second frame structure.

Example 36: The method of example 35, wherein the time duration in the first frame that is configured for sending the first wireless transmission is a reception duration, wherein the reception duration is a time duration in which receiving a transmission from any of the plurality of apparatuses is prohibited in the first frame.

Example 37: The method of example 36, wherein no transmission is received by the device or sent by the device to the plurality of apparatuses on the second frame structure during the reception duration.

Example 38: The method of example 36 or example 37, wherein the first frame includes a flexible duration in addition to and non-overlapping with the reception duration.

Example 39: The method of example 38, wherein during the flexible duration on the first frame the device: receives a transmission from a first apparatus of the plurality of apparatuses and does not transmit to the first apparatus; and transmits to a second apparatus of the plurality of apparatuses and does not receive a transmission from the second apparatus; and concurrently transmits to/receives a transmission from a third apparatus of the plurality of apparatuses.

Example 40: The method of example 38 or example 39, wherein the flexible duration is a duration in time in which a direction of communication is configurable on an apparatus-specific basis for each one of the plurality of apparatuses.

Example 41: The method of any one of examples 38 to 40, wherein the flexible duration is a first flexible duration, and wherein the second frame includes a second flexible duration that at least partially overlaps in time with the first flexible duration.

Example 42: The method of any one of examples 35 to 41, wherein the time duration in the second frame that is configured for receiving the second wireless transmission is a transmission duration, wherein the transmission duration is a time duration in which transmission from the device is prohibited in the second frame.

Example 43: The method of any one of examples 35 to 42, wherein the wirelessly communicating with the plurality of apparatuses occurs on a same serving cell, and wherein the first frame structure and the second frame structure are both configured for the same serving cell.

Example 44: The method of any one of examples 35 to 43, wherein the first frame structure is associated with a first carrier frequency and the second frame structure is associated with a second carrier frequency.

Example 45: The method of example 44, wherein the first carrier frequency is different from the second carrier frequency.

Example 46: The method of any one of examples 35 to 44, wherein the first frame and the second frame at least partially overlap in a frequency domain.

Example 47: The method of any one of examples 35 to 42, wherein: the first frame is on a first frequency band and the second frame is on a second frequency band; and/or the first frame is on a first frequency carrier and the second frame is on a second frequency carrier; and/or the first frame is for wireless communication on a first serving cell and the second frame is for wireless communication on a second serving cell; and/or the first frame is on a first bandwidth part (BWP) and the second frame is on a second BWP.

Example 48: The method of any one of examples 35 to 47, wherein the first indication is transmitted on first control signaling and the second indication is transmitted on second control signaling.

Example 49: The method of example 48, wherein the first control signaling and/or the second control signaling is common to the plurality of apparatuses.

Example 50: The method of any one of examples 35 to 47, wherein the first indication and the second indication are both transmitted in same control signaling.

Example 51: The method of example 50, wherein the first indication and the second indication are in different information elements in the same control signaling.

Example 52: The method of example 50 or example 51, wherein the same control signaling is common to the plurality of apparatuses.

Example 53: The method of any one of examples 35 to 52, wherein the first indication indicates at least one of the following parameters of the first frame structure: frame length of the first fame; subcarrier spacing of symbols communicated in the first frame; number of time durations within the first frame for which a respective communication direction is configured; length of one or more of the time durations within the first frame for which the respective communication direction is configured; the respective communication direction configured for each of the one or more time durations.

Example 54: The method of any one of examples 35 to 53, wherein the second indication indicates at least one of the following parameters of the second frame structure: frame length of the second fame; subcarrier spacing of symbols communicated in the second frame; number of time durations within the second frame for which a respective communication direction is configured; length of one or more of the time durations within the second frame for which the respective communication direction is configured; the respective communication direction configured for each of the one or more time durations.

Example 55: The method of any one of examples 35 to 47, comprising transmitting first control signaling that is common to the plurality of apparatuses, the first control signaling indicating at least one of: frame length of the first fame; subcarrier spacing of symbols communicated in the first frame; number of time durations within the first frame for which a respective communication direction is configured; length of one or more of the time durations within the first frame for which the respective communication direction is configured; the respective communication direction configured for each of the one or more time durations.

Example 56: The method of example 55, comprising transmitting second control signaling that is specific to a particular apparatus of the plurality of apparatuses, the second control signaling indicating, for a particular time duration for which the communication direction is configured as a flexible duration, whether the particular apparatus is to wirelessly transmit to the device and/or wirelessly receive from the device during the flexible duration.

Example 57: The method of example 56, wherein the first indication is in the first control signaling or the second control signaling.

Example 58: The method of example 48 or 49 or 55 or 56 or 57, wherein the first control signaling is present in radio resource control (RRC) signaling and/or downlink control information (DCI).

Example 59: The method of example 48 or 49 or 56 or 57, wherein the second control signaling is present in radio resource control (RRC) signaling and/or downlink control information (DCI).

Example 60: The method of any one of examples 35 to 59, wherein the first frame is used for communicating first symbols having a first subcarrier spacing, and wherein the second frame is used for communicating second symbols having a second subcarrier spacing.

Example 61: The method of any one of examples 35 to 60, wherein a start of the second frame is offset in time from the start of the first frame.

Example 62: The method of any one of examples 35 to 61, wherein a frame number of the first frame is the same as the frame number of the second frame.

Example 63: The method of any one of examples 35 to 61, wherein a frame number of the first frame is different from the frame number of the second frame.

Example 64: The method of any one of examples 35 to 63, wherein a maximum frame number in the first frame structure is different from the maximum frame number in the second frame structure.

Example 65: The method of any one of examples 35 to 64, wherein the device is a network device, wherein each apparatus of the plurality of apparatuses is a user equipment, and wherein in the time duration that is configured for sending the first wireless transmission from the device: (i) uplink transmission is prohibited on the first frame, and (ii) the device is to transmit a downlink transmission on the first frame.

Example 66: The method of any one of examples 35 to 64, wherein the device is a user equipment.

Example 67: The method of example 66, wherein each apparatus of the plurality of apparatuses is also a user equipment.

Example 68: A device configured to perform the method of any one of examples 35 to 67.

Example 69: A device comprising a processor and a memory; the memory including processor-executable instruction that, when executed by the processor, cause the processor to control the device to perform the method of any one of examples 35 to 67.

Example 70: A device comprising: a transmitter to: transmit a first indication that configures a first frame structure, wherein a first frame in the first frame structure includes a time duration that is configured for sending a first wireless transmission from the device to at least one apparatus of a plurality of apparatuses; transmit a second indication that configures a second frame structure, wherein a second frame in the second frame structure includes a time duration that is configured for receiving a second wireless transmission from one or more of the plurality of apparatuses; the transmitter and a receiver to wirelessly communicate with the plurality of apparatuses according to the first frame structure and the second frame structure.

Example 71: A method performed by an apparatus, the method comprising: wirelessly communicating with a device in a first frame of a first frame structure; concurrently wirelessly communicating with the device in a second frame of a second frame structure; wherein the first frame, but not the second frame, includes a reception duration, wherein the reception duration is a time duration in which wireless transmission to the device is prohibited on the first frame structure and in which the apparatus is to receive a wireless communication from the device on the first frame structure.

Example 72: The method of example 71, wherein the second frame, but not the first frame, includes a transmission duration, wherein the transmission duration is a time duration in which wireless transmission from the device is prohibited on the second frame structure and in which the apparatus is to wirelessly transmit to the device on the second frame structure.

Example 73: The method of example 71 or example 72, wherein the first frame includes a flexible duration in addition to and non-overlapping with the reception duration, wherein the flexible duration is a duration in time in which a direction of communication is configurable on an apparatus-specific basis, and the apparatus is configured to transmit a first wireless transmission to the device and/or receive a second wireless transmission from the device during the flexible duration.

Example 74: The method of example 73, wherein the apparatus performs full duplex (FD) communication in the flexible duration in order to concurrently transmit the first wireless transmission to the device and receive the second wireless transmission from the device, and wherein the apparatus does not perform the FD communication in the reception duration, but instead is configured only for wirelessly receiving on the first frame structure during the reception duration.

Example 75: The method of example 73 or example 74, wherein the flexible duration is a first flexible duration, and wherein the second frame includes a second flexible duration that at least partially overlaps in time with the first flexible duration.

Example 76: The method of any one of examples 71 to 75, wherein the first frame and the second frame at least partially overlap in the frequency domain, and wherein no transmission is sent or received by the apparatus in the second frame during the reception duration of the first frame.

Example 77: The method of any one of examples 71 to 75, wherein: the first frame is on a first frequency band and the second frame is on a second frequency band; and/or the first frame is on a first frequency carrier and the second frame is on a second frequency carrier; and/or the first frame is for wireless communication on a first serving cell and the second frame is for wireless communication on a second serving cell; and/or the first frame is on a first bandwidth part (BWP) and the second frame is on a second BWP.

Example 78: The method of any one of examples 71 to 77, further comprising receiving control signaling configuring at least one parameter of the first frame structure and/or the second frame structure.

Example 79: The method of example 78, wherein receiving the control signaling comprises: receiving first control signaling that is common to a plurality of apparatuses, the first control signaling indicating at least one of: frame length of the first fame; subcarrier spacing of symbols communicated in the first frame; number of time durations within the first frame for which a respective communication direction is configured; length of one or more of the time durations within the first frame for which the respective communication direction is configured; the respective communication direction configured for each of the one or more time durations; receiving second control signaling that is specific to the apparatus, the second control signaling indicating, for a particular time duration for which the communication direction is configured as a flexible duration, whether the apparatus is to wirelessly transmit to the device and/or wirelessly receive from the device during the flexible duration.

Example 80: The method of example 79, wherein the second control signaling is present in radio resource control (RRC) signaling and/or downlink control information (DCI).

Example 81: The method of any one of examples 71 to 80, wherein the first frame is used for communicating first symbols having a first subcarrier spacing, and wherein the second frame is used for communicating second symbols having a second subcarrier spacing.

Example 82: The method of example 81, wherein the first frame and the second frame have different frame lengths.

Example 83: The method of any one of examples 71 to 82, wherein a start of the second frame is offset in time from the start of the first frame.

Example 84: The method of any one of examples 71 to 83, wherein a frame number of the first frame is the same as the frame number of the second frame.

Example 85: The method of any one of examples 71 to 83, wherein a frame number of the first frame is different from the frame number of the second frame.

Example 86: The method of example 84 or example 85, wherein a maximum frame number in the first frame structure is different from the maximum frame number in the second frame structure.

Example 87: The method of any one of examples 71 to 86, wherein the apparatus is a user equipment, wherein the device is a network device, and wherein in the reception duration: (i) uplink transmission is prohibited on the first frame structure, and (ii) the apparatus is to receive a downlink transmission on the first frame structure.

Example 88: The method of any one of examples 71 to 86, wherein the apparatus is a first user equipment and the device is a second user equipment.

Example 89: An apparatus configured to perform the method of any one of examples 71 to 88.

Example 90: An apparatus comprising a processor and a memory; the memory including processor-executable instruction that, when executed by the processor, cause the processor to control the apparatus to perform the method of any one of examples 71 to 88.

Example 91: An apparatus comprising: a transmitter and a receiver to wirelessly communicate with a device in a first frame of a first frame structure; the transmitter and the receiver to concurrently wirelessly communicate with the device in a second frame of a second frame structure; wherein the first frame, but not the second frame, includes a reception duration, wherein the reception duration is a time duration in which wireless transmission to the device is prohibited on the first frame structure and in which the apparatus is to receive a wireless communication from the device on the first frame structure.

Example 92: A method performed by a device, the method comprising: wirelessly communicating with a first group of apparatuses in a first frame of a first frame structure; concurrently wirelessly communicating with a second group of apparatuses in a second frame of a second frame structure; wherein the first frame, but not the second frame, includes a reception duration, wherein the reception duration is a time duration in which wireless transmission from the first group of apparatuses to the device is prohibited on the first frame structure and in which the device is to transmit a wireless communication to the first group of apparatuses on the first frame structure.

Example 93: The method of example 92, wherein the first group of apparatuses and the second group of apparatuses are a same single group of apparatuses.

Example 94: The method of example 92, wherein at least one apparatus in the first group of apparatuses is also in the second group of apparatuses.

Example 95: The method of any one of examples 92 to 94, wherein the second frame, but not the first frame, includes a transmission duration, wherein the transmission duration is a time duration in which wireless transmission from the device to the second group of apparatuses is prohibited on the second frame structure and in which the device is to receive a wireless transmission from at least one apparatus of the second group of apparatuses on the second frame structure.

Example 96: The method of any one of examples 92 to 95, wherein the first frame includes a flexible duration in addition to and non-overlapping with the reception duration, wherein the flexible duration is a duration in time in which a direction of communication is configurable on an apparatus-specific basis for each apparatus of the first group of apparatuses.

Example 97: The method of example 96, wherein during the flexible duration on the first frame structure the device: receives a transmission from a first apparatus in the first group of apparatuses and does not transmit to the first apparatus; and transmits to a second apparatus in the first group of apparatuses and does not receive a transmission from the second apparatus; and concurrently transmits to/receives a transmission from a third apparatus in the first group of apparatuses.

Example 98: The method of example 97, wherein the first apparatus operates in frequency division duplex (FDD) communication mode or time division duplex (TDD) communication mode, wherein the second apparatus also operates in FDD or TDD mode, and wherein the third apparatus operates in full duplex (FD) communication mode.

Example 99: The method of any one of examples 92 to 98, wherein the first group of apparatuses and the second group of apparatuses include apparatuses that operate in TDD communication mode and/or FDD communication mode and/or FD communication mode.

Example 100: The method of any one of examples 92 to 99, wherein the first frame and the second frame at least partially overlap in the frequency domain, and wherein no transmission is sent or received by the device in the second frame during the reception duration of the first frame.

Example 101: The method of any one of examples 92 to 99, wherein: the first frame is on a first frequency band and the second frame is on a second frequency band; and/or the first frame is on a first frequency carrier and the second frame is on a second frequency carrier; and/or the first frame is for wireless communication on a first serving cell and the second frame is for wireless communication on a second serving cell; and/or the first frame is on a first bandwidth part (BWP) and the second frame is on a second BWP.

Example 102: The method of any one of examples 92 to 101, further comprising transmitting control signaling configuring at least one parameter of the first frame structure and/or the second frame structure.

Example 103: The method of example 102, wherein transmitting the control signaling comprises: transmitting first control signaling that is common to the first group of apparatuses, the first control signaling indicating at least one of: frame length of the first fame; subcarrier spacing of symbols communicated in the first frame; number of time durations within the first frame for which a respective communication direction is configured; length of one or more of the time durations within the first frame for which the respective communication direction is configured; the respective communication direction configured for each of the one or more time durations; transmitting apparatus-specific control signaling to each apparatus in the first group of apparatuses, the apparatus-specific control signaling indicating, for a particular time duration for which the communication direction is configured as a flexible duration, whether the apparatus is to wirelessly transmit to the device and/or wirelessly receive from the device during the flexible duration.

Example 104: The method of example 103, wherein the apparatus-specific control signaling is transmitted in radio resource control (RRC) signaling and/or downlink control information (DCI).

Example 105: The method of any one of examples 92 to 104, wherein the first frame is used for communicating first symbols having a first subcarrier spacing, and wherein the second frame is used for communicating second symbols having a second subcarrier spacing.

Example 106: The method of example 105, wherein the first frame and the second frame have different frame lengths.

Example 107: The method of any one of examples 92 to 106, wherein a start of the second frame is offset in time from the start of the first frame.

Example 108: The method of any one of examples 92 to 107, wherein a frame number of the first frame is the same as the frame number of the second frame.

Example 109: The method of any one of examples 92 to 107, wherein a frame number of the first frame is different from the frame number of the second frame.

Example 110: The method of example 108 or example 109, wherein a maximum frame number in the first frame structure is different from the maximum frame number in the second frame structure.

Example 111: The method of any one of examples 92 to 110, wherein the device is a network device, wherein each apparatus in the first group of apparatuses and in the second group of apparatuses is a user equipment, and wherein in the reception duration: (i) uplink transmission is prohibited on the first frame structure, and (ii) the device is to transmit a downlink transmission on the first frame structure.

Example 112: The method of any one of examples 92 to 110, wherein the device is a user equipment.

Example 113: The method of example 112, wherein each apparatus in the first group of apparatuses and in the second group of apparatuses is also a user equipment.

Example 114: A device configured to perform the method of any one of examples 92 to 113.

Example 115: A device comprising a processor and a memory; the memory including processor-executable instruction that, when executed by the processor, cause the processor to control the device to perform the method of any one of examples 92 to 113.

Example 116: A device comprising: a transmitter and a receiver to wirelessly communicate with a first group of apparatuses in a first frame of a first frame structure; the transmitter and the receiver to concurrently wirelessly communicate with a second group of apparatuses in a second frame of a second frame structure; wherein the first frame, but not the second frame, includes a reception duration, wherein the reception duration is a time duration in which wireless transmission from the first group of apparatuses to the device is prohibited on the first frame structure and in which the device is to transmit a wireless communication to the first group of apparatuses on the first frame structure.

Although the present disclosure has been described with reference to specific features and embodiments thereof, various modifications and combinations can be made thereto without departing from the present disclosure. The description and drawings are, accordingly, to be regarded simply as an illustration of some embodiments of the present disclosure as defined by the appended claims, and are contemplated to cover any and all modifications, variations, combinations or equivalents that fall within the scope of the present disclosure. Therefore, although the present disclosure and its advantages have been described in detail, various changes, substitutions and alterations can be made herein without departing from the present disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

What is claimed is:

1. A method performed by an apparatus, comprising:
receiving a first indication for a first frame structure for the apparatus, wherein the first indication indicates a first frame length of a first frame in the first frame structure, a first number of time durations within the first frame for which a first respective communication direction is configured, and a second number of time durations within the first frame for which a second respective communication direction is configured, and wherein the first frame in the first frame structure includes a first time duration that is configured for the apparatus to receive a first wireless transmission on the first frame structure from a device;
receiving a second indication for a second frame structure for the apparatus, wherein the second indication indicates a second frame length of a second frame in the second frame structure, and wherein the second frame in the second frame structure is configured for the apparatus to transmit a second wireless transmission on the second frame structure to the device, wherein the second frame includes a second time duration, and wherein the second time duration is a reserved time duration in which both transmission and reception are prohibited; and
wirelessly communicating with the device according to the first frame structure and the second frame structure.

2. The method of claim 1, wherein the first indication and the second indication are both received in a same information element or in different information elements of same control signaling.

3. The method of claim 2, wherein the same control signaling is common to a plurality of apparatuses.

4. The method of claim 1, wherein the first indication further indicates at least one of following parameters of the first frame structure:
a first subcarrier spacing of symbols communicated in the first frame,
a first length of one or more of the time durations within the first frame for which the first respective communication direction is configured, or
the first respective communication direction configured for each of the one or more of the time durations.

5. The method of claim 1, wherein the second indication further indicates at least one of following parameters of the second frame structure:
a second subcarrier spacing of symbols communicated in the second frame,
a fourth number of time durations within the second frame for which the second respective communication direction is configured, a second length of one or more of the time durations within the second frame for which the second respective communication direction is configured, or
the second respective communication direction configured for each of the one or more of the time durations.

6. The method of claim 1, wherein the first frame includes a flexible time duration, and the flexible time duration is in addition to and non-overlapping with a reception duration.

7. The method of claim 1, wherein a reception duration is for sending downlink control signaling.

8. The method of claim 7, wherein the downlink control signaling includes at least one of: a primary synchronization signal (PSS), a secondary synchronization signal (SSS), a master information block (MIB), a system information block (SIB), or a paging channel (PCH).

9. An apparatus, comprising:
a memory to store processor-executable instructions; and
at least one processor to execute the processor-executable instructions to cause the apparatus to:
receive a first indication for a first frame structure for the apparatus, wherein the first indication indicates a first frame length of a first frame in the first frame structure, a first number of time durations within the first frame for which a first respective communication direction is configured, and a second number of time durations within the first frame for which a second respective communication direction is configured, and wherein the first frame in the first frame structure includes a first time duration that is configured for the apparatus to receive a first wireless transmission on the first frame structure from a device;
receive a second indication for a second frame structure for the apparatus, wherein the second indication indicates a second frame length of a second frame in the second frame structure, and wherein the second frame in the second frame structure is configured for the apparatus to transmit a second wireless transmission on the second frame structure to the device, wherein the second frame includes a second time duration, and wherein the second time duration is a reserved time duration in which both transmission and reception are prohibited; and
wirelessly communicate with the device according to the first frame structure and the second frame structure.

10. The apparatus of claim 9, wherein the first indication and the second indication are both received in a same information element or in different information elements of same control signaling.

11. The apparatus of claim 10, wherein the same control signaling is common to a plurality of apparatuses.

12. The apparatus of claim 9, wherein the first indication further indicates at least one of following parameters of the first frame structure:
a first subcarrier spacing of symbols communicated in the first frame,
a first length of one or more of the time durations within the first frame for which the first respective communication direction is configured, or
the first respective communication direction configured for each of the one or more of the time durations.

13. The apparatus of claim 9, wherein the second indication further indicates at least one of following parameters of the second frame structure:
a second subcarrier spacing of symbols communicated in the second frame, a fourth number of time durations within the second frame for which the second respective communication direction is configured, a second length of one or more of the time durations within the second frame for which the second respective communication direction is configured, or the second respective communication direction configured for each of the one or more of the time durations.

14. The apparatus of claim 9, wherein the first frame includes a flexible time duration, and the flexible time duration is in addition to and non-overlapping with a reception duration.

15. The apparatus of claim 9, wherein a reception duration is for sending downlink control signaling.

16. The apparatus of claim 15, wherein the downlink control signaling includes at least one of: a primary synchronization signal (PSS), a secondary synchronization signal (SSS), a master information block (MIB), a system information block (SIB), or a paging channel (PCH).

17. The apparatus of claim 9, wherein the first indication further indicates at least one of a third number of time durations within the first frame for which a flexible communication direction is configured or a fourth number of reserved time durations within the first frame, and wherein the first indication further indicates corresponding lengths for all of the time durations within the first frame for which the first respective communication direction is configured.

18. A method performed by a device, the method comprising:

transmitting a first indication for a first frame structure for at least one apparatus of a plurality of apparatuses, wherein the first indication indicates a first frame length of a first frame in the first frame structure, a first number of time durations within the first frame for which a first respective communication direction is configured, and a second number of time durations within the first frame for which a second respective communication direction is configured, and wherein the first frame in the first frame structure includes a first time duration that is configured for sending a first wireless transmission on the first frame structure from the device to the at least one apparatus;

transmitting a second indication for a second frame structure for the at least one apparatus, wherein the second indication indicates a second frame length of a second frame in the second frame structure, and wherein the second frame in the second frame structure is configured for receiving a second wireless transmission on the second frame structure from the at least one apparatus, wherein the second frame includes a second time duration, and wherein the second time duration is a reserved time duration in which both transmission and reception are prohibited; and wirelessly communicating with the at least one apparatus according to the first frame structure and the second frame structure.

* * * * *